United States Patent
Strasman

(10) Patent No.: US 11,553,377 B2
(45) Date of Patent: Jan. 10, 2023

(54) SYSTEM, DEVICE, AND METHOD OF CELLULAR CONGESTION MANAGEMENT WITHOUT CELL AWARENESS

(71) Applicant: ALLOT LTD., Hod HaSharon (IL)

(72) Inventor: Nery Strasman, Ramat Gan (IL)

(73) Assignee: ALLOT LTD., Hod Hasharon (IL)

( * ) Notice: Subject to any disclaimer, the term of this patent is extended or adjusted under 35 U.S.C. 154(b) by 139 days.

(21) Appl. No.: 17/176,261

(22) Filed: Feb. 16, 2021

(65) Prior Publication Data

US 2022/0264371 A1    Aug. 18, 2022

(51) Int. Cl.
| | |
|---|---|
| H04W 28/08 | (2009.01) |
| H04W 28/02 | (2009.01) |
| H04L 43/0864 | (2022.01) |
| H04W 72/08 | (2009.01) |
| H04W 72/12 | (2009.01) |

(52) U.S. Cl.
CPC ..... *H04W 28/0992* (2020.05); *H04L 43/0864* (2013.01); *H04W 28/0268* (2013.01); *H04W 28/0289* (2013.01); *H04W 28/0867* (2020.05); *H04W 72/085* (2013.01); *H04W 72/1273* (2013.01)

(58) Field of Classification Search
CPC ......... H04W 28/0992; H04W 28/0268; H04W 28/0289; H04W 28/0867; H04W 72/085; H04W 72/1273; H04W 28/0284; H04L 43/0864; H04L 47/11; H04L 47/12
See application file for complete search history.

(56) References Cited

U.S. PATENT DOCUMENTS

| | | | | |
|---|---|---|---|---|
| 8,547,846 B1 * | 10/2013 | Ma | ........................ | H04L 47/30 370/413 |
| 2008/0002656 A1 * | 1/2008 | Lundh | ..................... | H04L 47/25 370/342 |

(Continued)

FOREIGN PATENT DOCUMENTS

CA    2 815 050 A1    11/2014

OTHER PUBLICATIONS

European search report dated Jun. 1, 2022, from corresponding European application No. 22 15 6623.5.

*Primary Examiner* — Eunsook Choi
(74) *Attorney, Agent, or Firm* — Browdy and Neimark, PLLC

(57) ABSTRACT

System, device, and method of cellular congestion management without cell awareness. A system defines applications as important or non-important. The system measures and monitors parameters related to cellular traffic, and remotely generates an estimate that a first User Equipment (UE) is experiencing cellular traffic congestion. A Deep Packet Inspection (DPI) Engine determines that the first UE is utilizing a first communication flow associated with an Important Application, and is also utilizing a second communication flow associated with a Non-Important Application. Filtering pass-through bitrate limits are enforced, selectively and remotely, on communication flows of the first UE, by enforcing a reduced bitrate limit on the second communication flow that is associated with a Non-Important Application, and by not enforcing a reduced bitrate limit on the first communication flow that is associated with an Important Application.

20 Claims, 1 Drawing Sheet

(56) References Cited

U.S. PATENT DOCUMENTS

| | | | | |
|---|---|---|---|---|
| 2014/0301195 A1* | 10/2014 | Briscoe | .................. | H04L 47/11 |
| | | | | 370/230.1 |
| 2016/0050580 A1* | 2/2016 | Bosch | ................. | H04L 12/6418 |
| | | | | 370/252 |
| 2018/0220327 A1 | 8/2018 | Karampatsis et al. | | |
| 2020/0359395 A1* | 11/2020 | Lohmar | .................. | H04L 47/24 |

* cited by examiner

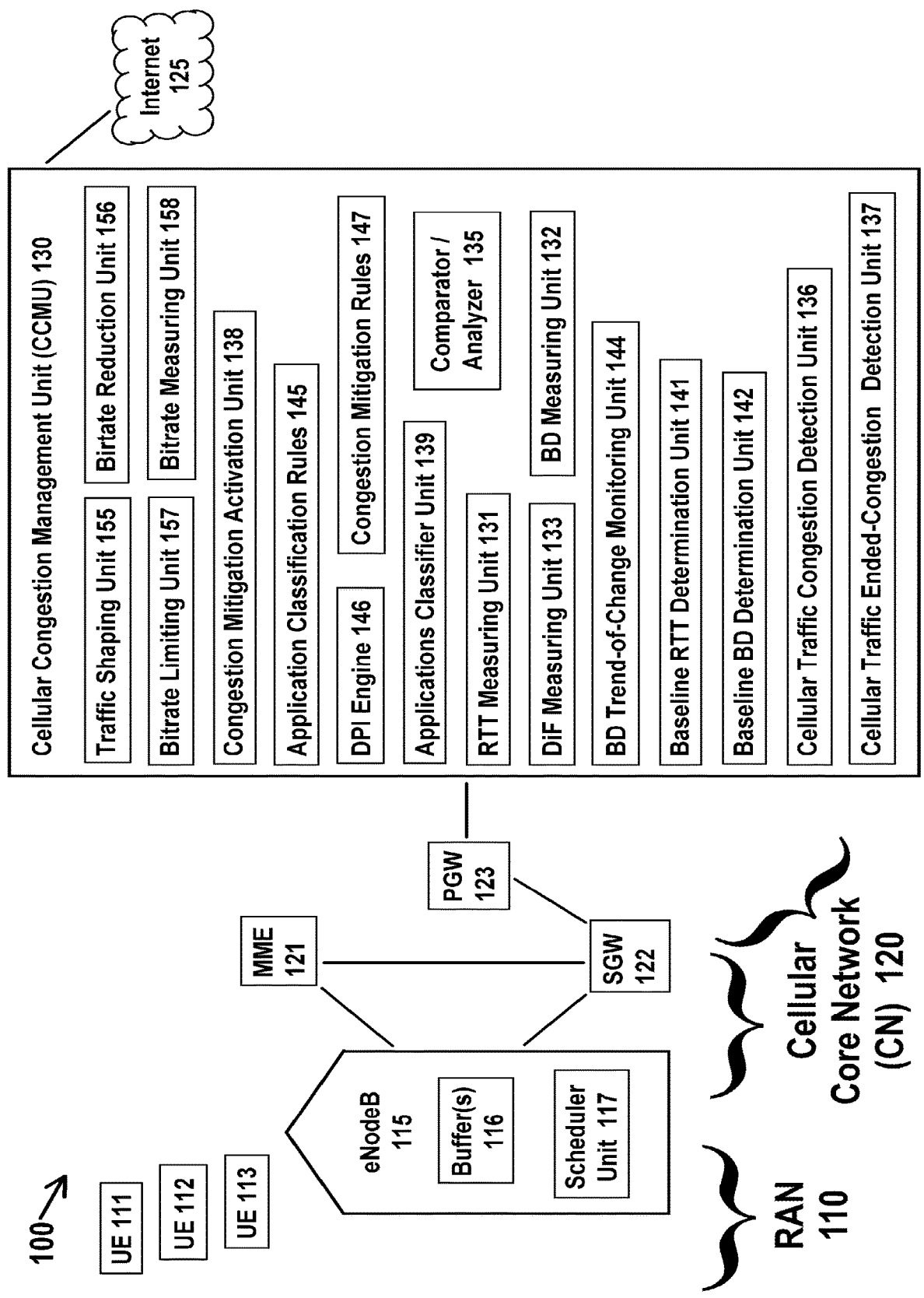

SYSTEM, DEVICE, AND METHOD OF CELLULAR CONGESTION MANAGEMENT WITHOUT CELL AWARENESS

FIELD

The present invention relates to the field of cellular communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments of the present invention may provide systems, devices, and methods of cellular congestion management without cell awareness. For example, a system includes a Cellular Congestion Management Unit, operable to mitigate cellular traffic congestion that one or more User Equipment (UE) devices experience in a cellular communication network. The the cellular communication network comprises at least a first UE and a second UE. The Cellular Congestion Management Unit comprises: (a) an Applications Classification Unit, to define that a first application is considered an Important Application, and to define that a second application is considered a Non-Important Application; (b) a Cellular Traffic Congestion Detection Unit, to measure and to monitor one or more parameters related to traffic transmitted by or sent to the first UE, and to remotely generate an estimate that the first UE is currently experiencing cellular traffic congestion; wherein said estimate that the first UE is currently experiencing cellular traffic congestion, is generated remotely from said first UE and remotely from the second UE, and without knowledge of which particular cellular network cell is currently being utilized by the first UE or by the second UE; (c) a Deep Packet Inspection (DPI) Engine, to perform DPI analysis of cellular data packets that are transmitted by and sent to the first UE; and to determine, based on DPI analysis, that the first UE is currently utilizing a first communication flow that is associated with an Important Application; and to further determine, based on DPI analysis, that the first UE is currently utilizing a second communication flow that is associated with a Non-Important Application; (d) a Bitrate Limiting Unit, to remotely and selectively enforce filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE; wherein remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE; wherein the remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

The present invention may provide other and/or additional advantages and/or benefits.

BRIEF DESCRIPTION OF THE DRAWINGS

FIG. 1 is a schematic illustration of a system, in accordance with some demonstrative embodiments of the present invention.

DETAILED DESCRIPTION OF SOME DEMONSTRATIVE EMBODIMENTS

The present invention includes devices, systems, and method for management of cellular congestion; without cell awareness, and/or without relying on or utilizing server-side information, and/or independently from server-side information, and/or without controlling server-side performance or server-side operations or server-side applications that transmit the cellular traffic that cause cellular congestion and/or that is being transported within a congested cell, and/or without configuring or controlling such server-side applications or a traffic-transmitting server or a traffic-generating server; but rather, by uniquely managing the shared access medium by itself or the cellular medium by itself, and/or by managing or allocating or re-allocating traffic resources within (or of) the shared access medium or the cellular medium or the cell itself.

The Applicants have realized that some conventional systems attempt to handle cellular traffic congestion, by defining and utilizing inaccurate or unreliable assumptions with regard to cellular traffic; such as, a general assumption that cellular traffic would be congested on Mondays between 9 AM to 11 AM, or, a general assumption that cellular traffic would not be congested on Wednesday between 3 AM to 4 AM. In some conventional systems, a particular traffic shaping process is "blindly" enforced during such time-slots, regardless of whether cellular traffic congestion actually exists; thereby causing actual harm to the Quality of Service (QoS) or to the Quality of Experience (QoE) of some (or many) end-user devices or users or subscribers. Additionally or alternatively, such assumptions by conventional systems often miss or exclude other time-slots, in which actual cellular traffic congestion occurs; thereby causing additional harm or reduction to the QoS or QoE of users, during such time-slots that are not covered by the crude assumptions being used.

The Applicants have also realized that some conventional systems attempt to handle cellular traffic congestion, by utilizing active dedicated bearer management, through a Traffic Detection Function (TDF) that utilizes Type of Service (ToS) markings. For example, a TDF unit analyzes traffic types and marks flags in traffic headers. Additionally, through complex out-of-band mechanisms, the TDF unit notifies an Evolved Node B (eNB) to modify a value of a QoS Class Identifier (QCI), which indicates the priority of the marked packets; and the conventional system then allocates higher bandwidth to applications that are classified as having higher importance. However, such conventional system requires the acquisition, deployment, configuration and maintenance of expensive and complex hardware devices, which are typically not available for cellular operators or cellular providers, or which are typically not installed or deployed by cellular providers. Furthermore, such conventional system adds a significant volume of signaling and out-of-band messages in the cellular network, thereby consuming bandwidth as well as memory resources and processing resources. Moreover, the excessive amount of signaling and messaging that this conventional system requires, effectively limits the capability of such convention system to react rapidly and efficiently to changes in the actual cellular traffic, or to rapidly handle a sudden congestion in cellular traffic; and thus, such conventional system is inaccurate in its ability to shape cellular traffic in real time or in near real time, and/or is incapable of rapidly handling cellular traffic congestion in real time or in near real time. In some implementations, the excessive marking and messaging also limits the scalability of such conventional system.

The Applicants have also realized that some conventional systems, which attempted to handle traffic congestion, had only attempted to improve the throughput of a communication connection or an application under network constraints, by performing actions at or within or on the transmitting server or the transmitting entity. In contrast, embodiments of the present invention operate to handle and/or manage and/or reduce cellular traffic congestion at or within a shared access medium, and not at the transmitting server or the transmitting entity, and without any relation to the transmitting server or the transmitting entity, and without taking actions at or towards or in the transmitting server or the transmitting entity, and without configuring the transmitting server or the transmitting entity, and without sending commands or control messages to the transmitting server or the transmitting entity, and without modifying the operation and/or the properties and/or the configuration of the transmitting server or the transmitting entity; and by performing prioritization of applications and/or communication flows and/or communication connections within (or at) the shared access medium or within a congested cell of the shared access medium.

Furthermore, in contrast with conventional systems, embodiments of the present invention can operate without relying on a particular method of detection of cellular congestion, or without relying on a particular method of detecting or estimating that a particular cellular communication cell is congested, or without relying on a particular method for enforcement of bitrate limits or bitrate constraints. Rather, embodiments of the present invention operate to manage a shared cellular access medium without any prior knowledge about the shared cellular access medium, and/or without relying on any a-priori information about the shared cellular access medium.

In accordance with the present invention, managing the shared cellular access medium includes performing prioritization of applications and/or communication flows and/or cellular communication connections, within the shared cellular access medium. In some embodiments, since the system of the present invention does not control and does not attempt to control in any way the transmitting servers of the applications that transmit cellular data, the system of the present invention performs the prioritization of applications within the shared cellular access medium by limiting or constraining (or, setting and enforcing an upper limit to) the cellular bandwidth that is consumed by (or, that is allocated or utilized by) the lower-priority applications. The Applicants have realized that when an application (and specifically, a high priority application) utilizes Transmission Control Protocol (TCP) or a similar transport mechanism, such application typically attempts to consume as much bandwidth as possible, since TCP is a mechanism that constantly tries to consume more bandwidth. Accordingly, realized the Applicants, in a situation where a low priority application and a high priority application are sharing (or are utilizing) the same shared cellular access medium, reducing the bitrate allocated to (or consumed by, or utilized by, or occupied by) the lower priority application, enables the higher priority application to "pick up" or to overtake the freed-up bandwidth and to utilize it for transport of cellular data by such higher priority application.

In accordance with the present invention, a communication network (and particularly, a cellular communication network) comprises communication links and nodes that are placed or deployed to enable good quality of communications, mostly between clients and servers. However, the Applicants realized that sometimes the cellular communication network, or one or more of its elements or components, may run out of available resources and cannot supply (or meet) the requested demand. Once the available resources are exhausted, the situation is cellular traffic congestion, in which QoS and QoE are degraded or even severely degraded. In some situations of congested cellular traffic, a first step to alleviate the situation is to delay the transmission of some of the excess cellular data that is pending or waiting for transmission, with the hope that the cellular traffic congestion is temporary and will pass soon, and that the waiting cellular data would be transmitted later. However, realized the Applicants, in order to enable such delayed transmission of pending traffic, one or more elements or components in the cellular communication network need to be able to buffer data, and particularly, such one or more elements or components may be required to temporarily buffer a large volume of pending data. This, realized the Applicants, is a temporal solution, and if the cellular traffic congestion lasts or persists, then the one or more network elements eventually run out of buffering resources, and pending data or data-in-flight would be discarded and lost, and will not be delivered to its intended destination or recipient.

Moreover, realized the Applicants, pending data is usually discarded in an agnostic manner, without any relationship to the impact that such discarding operation may have on the relevant application(s) and/or on the user experience or on the QoS or QoE of the end-user or end-users involved. As a result, such "blind" discarding of pending data, due to cellular traffic congestion, often leads to unhappy end-users who do not receive the QoS or QoE that they expect and/or that they demand; which in turn may lead to an increased number of complaints from such end-users towards customer service representatives of the cellular communications provider, as well as increased expenditures on customer care and/or customer maintenance and/or customer retention.

The Applicants have realized that the above-mentioned situations and results pose a significant problem for cellular service providers, cellular communications providers, and mobile operators. Some providers may attempt to alleviate the damage by adding infrastructure to their network; however, this is a costly effort, which cannot be rapidly deployed, and which requires manpower and efforts for purchasing, installing, configuring, and maintaining such additional network equipment, particularly when the expansion of infrastructure includes adding of base stations.

The present invention may operate, for example, in a Long Term Evolution (LTE) cellular network, in which a plurality of users (or end-users, or subscribers) exist, each user having a mobile device (or a mobile electronic device, or a User Equipment (UE), or a cellular device, such as a smartphone or a cellular phone or a cellular communications enabled tablet or smart-watch). In such LTE cellular network, the element that communicates directly with the UE is an Evolved Node B (or eNB, or eNodeB, or Evolved UTRAN or E-UTRAN); which handles the radio interface between the UE and the cellular network, and which allows the UE to interact reliably with cellular network elements. The UE is connected to a cell, which is a shared media element; and one eNB typically handles several cells.

In accordance with the present invention, the eNB comprises a Scheduler component, which allocates radio resources for cellular traffic that is downloaded by the UEs, and typically does such allocation of radio resources in very short time-periods. The resources that the eNB has, in order to transmit cellular data, are Physical Resource Blocks (PRBs). Once all the PRBs of a specific cell are utilized, the cell is congested. The Scheduler of the eNB that manages that cell, then determines which pending cellular traffic to deliver to the UEs, and which pending cellular traffic to buffer locally at the eNB (e.g., until one or more PRBs become available, or until the cellular traffic congestion in that particular cell is alleviated). The Applicants have realized that it may be beneficial that the Scheduler component of the eNB, when it makes such decisions about data delivery or data buffering, will utilize one or more particular rules or considerations, whose goals are to increase QoS or QOE, or to maintain at least a particular level of QoS or QoE, or to reduce (or to minimize) damage or degradation to the QoS or QoE. However, realized the Applicants, a conventional Scheduler component of a conventional eNB lacks any capability to make such decisions based on the content or the type or the properties of the pending cellular data, or based on the impact of discarding or delivering a particular portion of cellular data on the QoS or the QoE of the relevant user(s) or application(s) (which, in turn, may be tightly coupled to the content of such pending cellular data).

Some embodiments of the present invention may operate to ensure, provide and/or maintain a high level of end-user satisfaction, or a high level of QoS or QoE (which may be measured or monitored or estimated or calculated, in some embodiments, in quantitative score values or on numeric metrics; for example, based on dropped calls or dropped voice calls or dropped conversations, dropped video frames, page load time, lost packets, erroneous packets, bandwidth measurement, throughput measurement, goodput measurement, or the like). The system of the present invention operates to understand, identify, recognize and/or determine the different types of traffic that is being transmitted or is being transported or that is pending for transport in the shared cellular access medium (or, at a cellular eNB); and is further configured to perform prioritization (or ordering, or ranking) of applications, such as, based on (or, by taking into account) the estimated impact of a particular application on the end user experience, or the estimated impact on QoS or QoE (or, the estimated degradation or decrease in QoS or QoE) if one or more cellular data packets of a particular application would be discarded or lost or delayed (rather than being delivered to their intended destination and not being discarded at the eNB or otherwise lost in transport; and/or rather than being timely and immediately delivered to their intended destination without delay due to eNB buffering). Optionally, some embodiments may operate by measuring bitrate, and by making decisions and determinations based on bitrate and not only based on the measurements of dropped data or delayed data.

The system of the present invention is further configured to rapidly react or respond, in real time or in near real time, such as within milliseconds or within less than one second, to commencement of (or existence of, or detection of) cellular traffic congestion of a cell of cellular communication, and/or to the removal or the clearance or the stopping of such cellular traffic congestion in such cell. In some embodiments, the rapid reaction capability of the system is one of several important or distinguishing capabilities of the system of the present invention; in contrast with some conventional system, that attempt to "blindly" de-prioritize the traffic of a particular application that is pre-defined as non-important. The Applicants have realized that the conventional approach of a conventional system often leads to a sharp decline in (or significant degradation of) the throughput and/or total downloaded volume (e.g., per time unit) of the cellular communication network. The Applicants have further realized that the conventional approach often harms cellular communication providers or cellular system operators, which would prefer to have (and to provide to their end-users or subscribers) the maximum possible throughput while still maintaining the best possible experience or QoS or QoE. In contrast, the system of the present invention utilizes accurate and ad-hoc identification of a cellular traffic congestion, and to deploy or trigger or activate a tailored reaction or a tailored response (e.g., without configuring or modifying the server(s) of the transmitting entity or entities, and without sending to them commands, and without obtaining from them information).

The Applicants have realized that an important aspect of a cellular communication network is that UEs can move from one cell to another cell, in a process of "handover" or "handoff" between cells of the cellular communication network. Yet, the system and method of the present invention may be able to operate and to achieve its goals, without receiving and/or obtaining and/or estimating information about such handovers or handoffs, or without queries or responses with regard to occurred handovers or handoffs or with regard to occurring handovers or handoffs, and without relying on (or requiring) any information that indicates which particular UEs share the resources of the same cell of the cellular communication network; and/or without requesting and/or obtaining any information or data from any Radio Area Network (RAN), and/or without any direct communication with the RAN, and/or without directly interacting with any such RAN. Rather, the system and method of the present invention may manage and handle cellular traffic congestion in a cell of a cellular communication network, wherein the congestion management unit has limited information or no information at all with regard to occurred handovers or handoffs or with regard to occurring handovers or handoffs.

Reference is made to FIG. 1, which is a schematic block-diagram illustration of a system 100, in accordance with some demonstrative embodiments of the present invention. System 100 may be or may include, for example, a cellular 4G Long Term Evolution (LTE) communication network.

For demonstrative purposes, three User Equipment (UE) devices are shown, as UEs 111-113; they are operated by three different end-users or users or subscribers. Each UE is within a Radio Area Network (RAN) 110, and communicates separately with the same eNodeB 115; which in turn communicates with a cellular Core Network (CN) 120. For example, the eNodeB 115 communicates with a Mobility Management Entity (MME) 121, over (or via) an S1-MME interface or link. The MME 121 is a key control-node for the LTE access network; it handles idle mode UE paging and tagging procedures, including retransmissions; and is further involved in the bearer activation/deactivation process; and is also responsible for choosing the Serving Gateway for a particular UE at the initial attach and at time of intra-LTE handover involving Core Network (CN) node relocation; and it is also responsible for authenticating the user (e.g., by interacting with a Home Subscriber Server (HSS) or other entity).

It is clarified that eNodeB 115 is only a non-limiting demonstrative example; and in some embodiments, this component may be replaced by, or may substituted by, or may also comprise or include, or may be co-located with or may be co-operating with, other type(s) of Cellular Base Station, cellular radio base station, Node B unit or base station, gNB unit or base station, ng-eNB unit or base station, Base Transceiver Station (BTS), radio base station, or the like.

The eNodeB 115 further communicates with a Serving Gateway (SGW) 122, for example, over (or via) an S1-U interface or link. The SGW 115 routes and forwards data packets from a UE, while also acting as the mobility anchor for the user plane during inter-eNodeB handovers and as the anchor for mobility between LTE and other 3GPP technologies (e.g., terminating S4 interface, and relaying the traffic between 2G/3G systems and the Packet Data Network Gateway). For a UE in idle state UE, the SGW 122 terminates the downlink data path, and triggers paging when downlink data arrives for such UE. The SGW 122 manages and stores UE contexts, e.g., parameters of the Internet Protocol (IP) bearer service, or network internal routing information. The MME 121 may communicate with the SGW 122, for example, over (or via) an S11 interface or link.

The SGW 122 is further in communication (e.g., over or via an S5/S8 interface or link) with a Packet Data Network Gateway (PGW) 123 (or, a PDN Gateway); which provides connectivity from the UE to external Packet Data Networks (PDNs) by being its point of exit (for outgoing traffic) and its point of entry (for incoming traffic). In some implementations, a particular UE may have simultaneous connectivity with more than one PGW units, for accessing multiple packet data networks. The PGW 123 performs policy enforcement, packet filtering for each UE or for each user or subscriber, charging support, interception, packet screening, or other operations. The PGW 123 is also the anchor for mobility between 3GPP and non-3GPP technologies, such as WiMAX or 3GPP2 (CDMA 1× and EvDO).

In a conventional system, the PGW is connected directly to the Internet 125. In contrast, in system 100 of the present invention, a new component is introduced and deployed: a Cellular Congestion Management Unit (CCMU) 130, which is connected between the PGW 123 and the Internet 125. The PGW 123 communicates with the CCMU 130 over (or via) an SGI interface or link. In some embodiments, the CCMU 130 may perform detection and/or estimation of cellular traffic congestion within the CN 120; or, in other embodiments, the CCMU 130 may detect that an application is utilizing a congested cell, without the CCMU 130 knowing which particular cell it is. CCMU 130 then responds to such detected congestion or estimated congestion, by performing one or more pre-defined operations or processes to mitigate or alleviate or remove the cellular traffic congestion, and/or to indirectly cause mitigation or alleviation or removal of the cellular traffic congestion, and/or to (directly or indirectly) maintain or improve the QoS and/or the QoE of communication flows that share an unknown cell of the cellular network that is estimated to be congested.

The Applicants have realized that the resources that are available to the eNodeB 115 (e.g., physical resources, carriers, time-slots, Resource Blocks (RBs), Physical Resource Blocks (PRBs), or the like) do not map directly (or, in a constant manner or constant relation) to the resources that are needed by the applications that run on the various UEs (e.g., bandwidth). Accordingly, the system of the present invention may detect when (or whether) cellular traffic congestion exists, and when (or whether) such congestion is cleared or removed, only by monitoring and/or observing and/or analyzing transport layer characteristics of communication flows; for example, by defining, monitoring and utilizing a particular parameter and its derivatives to detect such congestion and to manage such congestion.

The Applicants have also realized that Transmission Control Protocol (TCP) is commonly utilized, and is considered to create a generally reliable connection as the client constantly updates the server if it received data packets. For example, upon reception of one or more data packets, the client acknowledges the reception by sending to the server (or to the sender, or to the sending entity) an Acknowledgement (ACK) message, referring to (or indicating, or mentioning the packet numbers of) the data packets that the client has indeed received.

In accordance with the present invention, a Round Trip Time (RTT) is defined as the duration of time that passes between: (i) the time-point at which the CCMU 130 transmits a data packet to a particular UE, and (ii) the time-point at which an ACK message, for that particular packet, which transmitted by that particular UE, arrives back at the CCMU 130. It is noted that an ACK message may refer to a single data packet; or, in some situations, may refer to several (a plurality of) data packets. If the ACK message referred to several data packets, then the RTT is defined only for the packet of the several packets that was transmitted latest from the CCMU 130 to the UE.

In accordance with the present invention, data that was already transmitted to the UE, but has not yet been acknowledged by that UE as data that was safely received (e.g., by successful deliver of an ACK message to the sending entity) is called "Data in Flight" (DiF); and its volume or quantity may be measured or counted, for example, in packets, in bits (or kilobits, or megabits, or gigabits), in bytes (or kilobytes, or megabytes, or gigabytes), or in other suitable units to indicate the quantity of Data-in-Flight, or Bits-in-Flight, or Bytes-in-Flight, or Packets-in-Flight, or the like. In some situations, a portion of the Data in Flight has already been delivered to the relevant UE, without being acknowledged yet; however, the Applicants have realized that the amount of Data in Flight may be utilized as a measure of (or an indicator of) the amount or the quantity or the volume of the data that is currently accumulated (or buffered, or is pending) at the eNodeB 115.

In accordance with the present invention, a Buffer Delay (BD) parameter is also defined, indicating the time delay that is experienced by data that accumulates in the buffer(s) of the eNodeB 115, or in a buffer 116 of a Scheduler Unit 117 of the eNodeB. The value of the Buffer Delay may be determined or estimated or computed or determined, for example, as the time period that passed since the time-point of transmission to the Scheduler Unit 117 of the oldest packet that still needs to be acknowledged and was not yet acknowledged.

The RTT parameter and the BD parameters are measured (or, are represented) in units of time; e.g., in seconds or milliseconds or other time-units. In some embodiments, the RTT parameter is associated with a particular communication flow or a particular communication connection, such that each communication flow or each communication connection is associated with its own, separate, RTT parameter having its own current value; in other embodiments, the RTT parameter may be defined or utilized per UE, or on a per-UE basis, such that each UE is associated with its own, separate, RTT parameter. The BD parameter may similarly be associated with a particular UE, or with a particular communication flow or communication connection. The DiF size parameter may similarly be associated with a particular UE, or with a particular communication flow or communication connection.

It is clarified that some portions of the discussion herein may relate to packets that are temporarily buffered at the eNodeB (or at the Cellular Base Station), or to time-delay in transport of packets that are temporarily buffered at the eNodeB (or at the Cellular Base Station); however, such phrases may relate, in some embodiments, to packets that have not been Acknowledged (via an ACK message). For example, some packets are indeed temporarily buffered at the eNodeB (or at the Cellular Base Station) and have not yet arrived at the UE device, and are regarded or counted as "buffered"; additionally, some other packets have already been transported from the eNodeB (or at the Cellular Base Station) to the UE device but an ACK message was not yet received for those packets, and therefore they may also be regarded or counted as "buffered" packets. The terms "buffered packets" or "packets that are buffered", or similar terms, may thus include both (i) packets that are indeed buffered at the eNodeB (or at the Cellular Base Station) and were not yet delivered to the intended UE device, and (ii) packets that were already transported to the UE device but were not yet acknowledged (via an ACK message).

In accordance with the present invention, CCMU 130 may include units or components or module that measure or estimate or determine or compute the values of these parameters, and locally stores such parameter values, and utilize the values of such parameter for handling or managing cellular traffic congestion. For example, an RTT Measuring Unit 131 may measure or estimate or determine or compute the RTT value for a particular UE or communication flow or communication connection; a BD Measuring Unit 132 may measure or estimate or determine or compute the Buffer Delay (BD) value for a particular UE or communication flow or communication connection; a DiF Measuring Unit 133 may measure or estimate or determine or compute the quantity or the volume or the size of the DiF for a particular UE or communication flow or communication connection. It is noted that in some embodiments, these units (131, 132, 133) need not necessarily be co-located, or may be distributed across different units or different devices; although they are typically located between the PGW 123 and the Internet 125.

The Applicants have realized that a large value of the RTT parameter may be caused by one or more of the following reasons: (i) delay(s) in the Core Network; (ii) delay(s) in replies from the relevant UE; (iii) cellular traffic congestion and buffering within the eNodeB of transmitted data (e.g., buffering at the eNodeB of pending data that was already transmitted by the relevant UE but was not yet sent from the eNodeB to the CN due to lack of available physical resources).

The Applicants have realized that in most situations, the third cause is often the actual cause for a large RTT parameter value, rather than the first cause or the second cause. For example, the Applicants have realized that the first cause generally has low likelihood; if the Core Network is causing delays, then often the entirety of the cellular communication network of that communication provider or operating is not performing at all, or is not performing adequately. Nevertheless, it is noted that the congestion mitigation operations that are deployed or activated by the present invention, may still alleviate or mitigate the delays or the congestion even if it results from the first cause, of CN-based delays. Furthermore, the Applicants have also realized that the second cause also rare or unlikely in most situations, and if it occurs then it is often transient or short-term; as networking stacks on (or of, or at) UE devices are typically efficient, as they typically run in the kernel space or the kernel layer of the UE; indeed, in some situations, an acknowledgement (ACK) message of reception of a particular data packet may be delayed at the UE for different reasons (e.g., the UE's processor is busy with other tasks; or due to application-related reasons), but typically, realized the Applicants, the response (or the ACK message for received data packets) from the UE device is fast or almost immediate. The Applicants have thus realized that in most situations, large values of the RTT parameter are often, or almost always, caused by (or are related to) cellular traffic congestion.

In some embodiments, some of the physical resources that are available to the eNodeB, may be allocated to traffic that is pre-classified or is pre-defined to the eNodeB as "high priority" or as "higher priority". For example, high priority for particular traffic (e.g., a particular set of packets, or flow) may be defined or indicated to the eNodeB via a QoS Class Identifier (QCI) parameter of the bearer, assigned to such traffic when it is created. Generally, Internet traffic is typically assigned the lowest priority. Higher priority traffic, such as Voice over LTE or VoLTE, may have some bandwidth (or, physical resources) guaranteed to it by (or at) the eNodeB. However, such "guarantee" or reserving of bandwidth or physical resources, for a particular portion of the traffic that is pre-classified as "higher priority", does not negatively affect the operation of the traffic congestion management solution of the present invention. For example, any higher-priority traffic has the same effect as (or, a similar effect as) worse or worst reception conditions of the other traffic that needs to be managed; as pre-classification of some traffic portions as "higher priority" causes a decrease in the bandwidth (or physical resources) that remain available for the other, non-higher-priority, data traffic. Accordingly, the system of the present invention need not differentiate between cellular traffic congestion situations based on the existence of one or more such particular "bandwidth guarantee" or reservation of bandwidth (or physical resources) at the eNodeB for traffic portions that are pre-classified as higher priority traffic.

In accordance with the present invention, the system and its solution for congested cellular traffic may operate with very limited mobility information. For example, the system of the present invention, or the CCMU 130, may know (at most) the IP address and the identity of the main serving eNodeB, but it does not know (and does not need to know, and does not need to utilize or to rely upon) any handovers or handoffs within the eNodeB, or whether a handoff or handover is occurring within the eNodeB, or whether there is any Dual Connectivity to any particular UE.

In accordance with the present invention, the system (e.g., the CCMU 130) operates to detect or to estimate or to determine when (or whether) a particular UE, or one of its communication flows, is experiencing cellular traffic congestion; and then proceeds to accordingly deploy or activate one or more congestion mitigation operations. These operations are performed without understanding or knowing or determining which particular cell in the cellular communication network is the cell which has cellular congestion, or which particular cell of the cellular network is currently serving this particular UE (or any other particular UEs). For demonstrative purposes, some portions of the discussion herein are demonstrated in the context of per-UE basis; however, embodiments of the present invention may similarly be deployed or configured to operate on a per-flow basis (per communication flow) or on per-connection basis (per communication connection), or to otherwise handle separately each communication flow or each communication connection or each UE.

In accordance with the present invention, a numerical or quantitative indicator for existence of cellular data congestion, or conversely for the lack of cellular data congestion, is determined or computed based on a formula that takes into account at least the RTT value or parameter, the BD value or parameter, and the DiF size value or parameter. For example, the Applicants have realized that in a cellular network that is non-congested, or in a cellular network path that does not have a congested cell, a data packet is typically able to traverse the cellular network, from the sending entity to the recipient UE, and be full acknowledged (e.g., an ACK message from the UE is received back at the sending entity), within a pre-defined threshold value of T milliseconds; such as, within T=15 or 20 or 25 or 30 milliseconds in a typical 4G-LTE cellular network or in a typical 5G cellular network.

Accordingly, the Applicants have realized that in a cellular network that is non-congested, or in a cellular network path that does not have a congested cell, a UE or a communication flow or a communication connection typically has an RTT value of up to R milliseconds, wherein T is 15 or 20 or 25 or 30 milliseconds. Therefore, in accordance with the present invention, one of the factors or the criteria or the conditions for estimating or determining of detecting cellular traffic congestion, is based on the measured RTT value (e.g., per UE device, or per communication flow, or for communication connection).

In some embodiments, a Baseline RTT Determination Unit 141 (e.g., located in the CCMU 130, or co-located with or near the CCMU 130, or located between the PGW 123 and the Internet 125) may operate over time (e.g., over a few hours or days), to measure RTT values across the cellular network and to determine a Baseline RTT Value that should be expected during non-congestion. For example, a cellular network may be located in the United States; and the Baseline RTT Determination Unit 141 may operate between 3 AM to 4 AM Central Time (e.g., when most businesses are closed, and when many or most users are asleep), to measure RTT values of multiple different UE devices or communication flows or communication connection; and to average them. In other embodiments, the Baseline RTT Determination Unit 141 may operate during regular business hours, for a particular time-slot, to measure RTT values and to calculate a baseline during daytime and business hours; particularly at time-slots for which there are not more than N complaints or reports of cellular congestion (e.g., from complaining/reporting end-users, or from congestion-detecting applications or from congestion-sensitive applications). In a demonstrative example, the Baseline RTT Value for a 4G-LTE cellular network may be T=24 milliseconds. In another example, multiple Baseline RTT Values may be calculated and defined; for example, a Daytime (or business-hours) Baseline RTT Value, that is measured and calculated during regular business hours (e.g., having a baseline RTT value of T1=30 milliseconds), and a Nighttime (or non-business-hours) RTT value, that is measured outside of regular business hours (e.g., having a baseline RTT value of T2=22 milliseconds).

In accordance with the present invention, once cellular traffic congestion begins, or occurs, or is ongoing, the current RTT values, or freshly-measured RTT values, would rise significantly, or would double or triple relative to the Baseline RTT value(s); such as, the current RTT values would reach at least two times the Baseline RTT Value (e.g., at least twice the general Baseline RTT value; or, in situations that utilize multiple Baseline RTT Values for different time-slots, at least twice the Baseline RTT Value of the relevant time-slot that corresponds to the current time). For example, an actual, or current, or fresh, or currently-measured, RTT value (per UE device, or per communication flow, or for communication connection) is measured, by the RTT Measuring Unit 131, and is compared (e.g., by a Comparator/Analyzer Unit 135) to the relevant (or the only) pre-defined Baseline RTT Value, in order to detect or determine or to estimate that cellular traffic congestion exists (or, does not currently exist).

The Applicants have also realized that in a cellular network that is non-congested, or in a cellular network path that does not have a congested cell, a UE or a communication flow or a communication connection typically has a Buffer Delay (BD) value that is within a particular range, or that is lower than a maximum threshold value; and the BD value increases or rises once cellular traffic congestion begins or exists. Accordingly, a Baseline BD Value Determination Unit 142 may measure BD values in general, to calculate (e.g., using an average) a baseline BD value for a cellular network that is known to be non-congested, or that is not known to be congested, or that is known to have no more than N concurrent (or recent) complaints or reports of congestion. The Baseline BD Value may be calculated generally for the cellular network; or, in some embodiments, several Baseline BD Values may be calculated to correspond to different time-slots (e.g., a first Baseline BD Value may be calculated and used for business hours; and a second, different, Baseline BD Value may be calculated and used for non-business-hours).

The estimation or calculation of the BD may utilize one or more calculation rules. For example, as ACK messages for various packets arrive at the CCMU 130 (on their way to the sending entity, through the Internet), then such arriving ACK messages enable the CCMU 130 to determine (e.g., based on packet serial numbers, and optionally by taking into account (in some implementations) an identification of "missing" packets that did not yet arrive based on packet serial numbers or based on other indicators) how many other packets are still "in flight". Furthermore, until an ACK message arrives at the CCMU 130, it is possible to determine or estimate the minimum RTT value, which in turn may be used to derive the Buffer Delay value.

For demonstrative purposes, here is a non-limiting example of derivation or calculation of Buffer Delay from measured RTT value(s). For example, packets are transmitted at time-points 1, 2, 3, 4, and 5. An ACK message is received for the packet that was transmitted at time-point 2, and the current time is time-point 10. Therefore, the oldest packet that was not yet acknowledged (was not yet ACKed) was sent at time-point 3. The buffer delay is therefore 10−3=7. Later, if by time-point 14 no additional ACK messages are seen, then the buffer delay is 14−3=11. Therefore, in some implementations, the Buffer Delay may be calculated or derived or determined as being equal to the difference in time between: (i) the time-point of transmission of the oldest packet that was transmitted and was not yet ACKed, and (i) the current time-point or "now".

It is noted that in some situations, the traffic may include non-TCP traffic, or may include packets or traffic portions for which an ACK message is not expected to be received; and some embodiments may thus not take into account such type(s) of packets or traffic, when calculating the Buffer Delay; although some embodiments may take into account such packets or traffic portions when calculating the DiF.

The Applicants have realized that the calculation of the BD value (baseline, or fresh) may sometimes suffer from noise or in accuracies, in its initial evaluation to establish the Baseline BD Value, and/or in fresh or current measurements that attempt to measure a current (or fresh) BD value for comparison purposes by the Comparison/Analyzer Unit 135. Therefore, in some embodiments, the evaluation or the measurement or the determination of such BD values (baseline BD value, current/fresh BD value) are performed over a time-period that is: sufficiently long to smoothen any such "noise", yet also, sufficiently short to allow generation of a meaningful or useful or relevant BD value for efficient and rapid management of cellular traffic congestion.

In some embodiments, the time-period for evaluating or measuring (or, for monitoring and collecting the data in order to compute) the BD value, may be defined or configured by taking into account one or more considerations or conditions or criteria; for example, the minimal RTT value, and also, which situations (and their numerical representations in terms of measurable QoS or measurable QoE) would constitute a negative effect or an adverse effect on user experience. For example, some embodiments may define a Minimal RTT Value (e.g., the minimum possible RTT value that is measured or observed in a non-congested adequately-operating 4G-LTE or 5G cellular network) as equivalent to 20 or 18 or 15 milliseconds. Similarly, some embodiments may define an adverse effect or a negative effect on user experience (or on QoE or on QoS) as a delay that is greater than 300 milliseconds. In such implementation, the time duration between two consecutive evaluations of the Buffer Delay should thus be larger than the Minimal RTT Value, for example, 2 times or 2.5 times or 3 times the Minimal RTT Value. For example, in some implementations, if the Minimal RTT Value is 20 milliseconds, then the time duration between two consecutive evaluations of the Buffer Delay should be at least 40 milliseconds. On the other hand, if the time duration between two consecutive evaluations of the Buffer Delay is too large (e.g., it is 900 milliseconds), then it would not allow the system to react rapidly enough to cellular traffic congestion. For example, in some implementations, the time duration between two consecutive evaluations of the Buffer Delay should be smaller than (for example) one-half or one-third the delay that causes a negative effect on user experience; and if such negative effect occurs with a delay of 300 milliseconds or more, then the time duration between two consecutive evaluations of the Buffer Delay should be smaller than 150 or 100 milliseconds. In a demonstrative implementation, the time duration between two consecutive evaluations of the Buffer Delay should be in the range of 40 to 100 milliseconds, or in the range of 30 to 100 milliseconds, or in the range of 40 to 150 milliseconds, or in the range of 30 to 150 milliseconds. Other suitable ranges-of-values may be used and may be configured into the system, to accommodate the actual characteristics of a particular cellular network.

The CCMU 130 includes a Cellular Traffic Congestion Detection Unit 136. For example, it may determine that a particular UE (or a particular communication flow, or a particular communication connection) is currently experiencing cellular traffic congestion, if the following conditions hold true, in the aggregate: (I) the current value of the Buffer Delay (BD) is at least a pre-defined threshold value (e.g., at least U milliseconds, wherein U is a positive number; for example, U being 100 milliseconds, or other pre-defined positive threshold value); and also, (II) the current value of BD is greater than the most-recent value of BD, or is greater than the value of BD that was calculated T milliseconds ago, or the current value of BD has increased or has risen in the past T milliseconds, or $BD_T - BD_{T-1} > 0$; and also, (III) the current value or size of the Data in Flight (DiF) is greater than a pre-defined threshold value (e.g., greater than P packets, such as, P being 10 packets; or greater than B1 bits if DiF is measured in bits; or greater than B2 bytes if DiF is measured in bytes). The Cellular Traffic Congestion Detection Unit 136 may check whether these three conditions hold true, periodically or at pre-defined time intervals, or continuously, or every K seconds, or every K milliseconds, or at random or pseudo-random time-points selected within a pre-defined range of values (e.g., every K seconds, wherein K is selected pseudo-randomly to be between 1 and 15). If, or when, the Cellular Traffic Congestion Detection Unit 136 determines that these three conditions hold true, then the Cellular Traffic Congestion Detection Unit 136 generates an output or a signal or a message indicating that this particular UE device (or this particular communication flow, or this particular communication connection) is currently experiencing cellular traffic congestion, and that it is estimated that a significant amount of data of this particular UE device (or this particular communication flow, or this particular communication connection) is currently being buffered or delayed or accumulated in the buffers 116 of the Scheduler Unit 117 of the eNodeB 115; such estimation or determination being performed remotely, by the Cellular Traffic Congestion Detection Unit 136 which is part of the CCMU 130 and is located away from the eNodeB 115, and is located or connected between the PGW 123 and the Internet 125.

The CCMU 130 further includes a Cellular Traffic Ended-Congestion Detection Unit 137. For example, it may determine that a particular UE (or a particular communication flow, or a particular communication connection) is currently not experiencing cellular traffic congestion, or that a previously-detected or previously-estimated or recently-detected or recently-estimated cellular traffic congestion (for that particular UE, or for that particular communication flow, or for that particular communication connection) has ended or has been alleviated or has been removed or no longer exists or is no longer ongoing. In some embodiments, the Cellular Traffic Ended-Congestion Detection Unit 137 may reach such "ended congestion" decision or determination, if at least one of the three conditions (that were mentioned above for remotely determining the cellular traffic congestion) no longer holds true. In other embodiments, the Cellular Traffic Ended-Congestion Detection Unit 137 may reach such "ended congestion" decision or determination, if at least the following two conditions hold true: (I) the current value of the Buffer Delay (BD) is smaller than a pre-defined threshold value (e.g., smaller than D milliseconds, wherein D is a positive number; for example, D being 50 milliseconds; note that the threshold value D used for detection of end-of-congestion, may be different from and may be smaller than the threshold value U that is used above for detection of current congestion); and also, (II) the current value of BD is smaller than the most-recent value of BD, or is smaller than the value of BD that was calculated T milliseconds ago, or the current value of BD has decreased or has fallen in the past T milliseconds, or $BD_T-BD_{T-1}<0$. In some embodiments or in some situations, the second condition may hold true when (or if) the first condition holds true.

In some embodiments, the trend-of-change in the BD value may be monitored or analyzed or determined by a dedicated unit or sub-unit or module, such as by a BD Trend-of-Change Monitoring Unit 144; which may be part of the CCMU 130, or may be associated with (or part of, or operably coupled to) the BD Measuring Unit 132. For example, the BD Trend-of-Change Monitoring Unit 144 may store at least two BD values, such as, the currently-measured (or the most-recently measured) BD value, and the most-previous (most-recent previously-measured) BD value that was measured immediately prior to the measuring of the most-recently-measured BD value. The BD Trend-of-Change Monitoring Unit 144 may perform a checking or a comparison, or a subtraction operation, to determine whether the current (or most recent) BD value is greater than the BD value that had been measured most-immediately prior to it (which corresponds to a BD increase trend-of-change, or to a BD expansion trend; which supports, or contributes to, an estimate that the UE is currently experiencing cellular traffic congestion); or conversely, whether the current (or most recent) BD value is smaller than the BD value that had been measured most-immediately prior to it (which corresponds to a BD decrease trend-of-change, or to a BD shrinkage trend or a BD reduction trend; which supports, or contributes to, an estimate that the UE is currently no longer experiencing cellular traffic congestion).

In accordance with some embodiments of the invention, the measurement and the monitoring of the RTT value may be useful and important, and may assist in deriving or measuring the other monitored values or parameters In some embodiments, decisions are based upon RTT value(s), or on Buffer Delay values, or on both of these values, optionally in combination with (or by taking into account also) other parameters or values, as described above and/or herein.

For example, in some embodiments, Buffer Delay values are measured and are utilized for decision making, whereas RTT are not measured and/or not utilized for such decision making. The Buffer Delay value may be utilized as an estimation or evaluation of the minimal value that the RTT can have. For example, if the Buffer Delay value is 300 milliseconds, it means that a packet had been transmitted 300 milliseconds ago but was not yet been ACKed. Once that package is ACKed, the RTT value will not be lower than 300 milliseconds. Therefore, in some embodiments, the Buffer Delay value may enable processing and decision-making even without receiving ACKs. In other embodiments, RTT values may be measured and utilized for decision making, instead of (or in addition to) utilization of Buffer Delay values; for example, if an RTT measurement mechanism was already developed and deployed and thus RTT values may be readily available.

In some embodiments, the measurement of the RTT value is performed continuously or generally continuously; for example, every 1 or 2 or 5 milliseconds, or for every packet, or for every 2 or 3 or 4 or 5 packets, or for every Nth packet (wherein N is smaller than 8, or smaller than 4, in some implementations), or at least at the packet resolution of the ACK message(s). In some embodiments, measuring the RTT value only once, or measuring the RTT value at a low resolution, may cause inaccuracy and/or delays and/or (in some situations) even failure in the detection of congestion and/or in the detection that a congestion ended. In some embodiments, a communication flow may last or may occupy several minutes or hours or even days; measuring the RTT value for such communication flow only occasionally (e.g., only during the setup of the communication connection, or only upon the initialization of the communication flow, or only a few seconds after the establishing of the communication flow), may cause the congestion detection processes to fail and to ignore the actual or current state of the UE or the flow or the connection.

In some embodiments, although cellular traffic congestion is often the main reason for an RTT value that is greater (e.g., at least twice greater) than the Baseline RTT Value, there may be other possible reasons for a large RTT value; for example, the processor of the UE may be temporarily occupied or busy performing intensive processing operations and therefore has not yet commanded to transmit an ACK message for an already-arrived packet. Therefore, some embodiments may filter out "noise" in the RTT value measurements, to avoid reliance on one single RTT value measurement alone for the purpose of defining or determining the current state (namely, whether or not there currently is cellular traffic congestion). In some embodiments, this may be achieved by monitoring or measuring the rise (or, the fall) in the Buffer Delay (BD) value over time-period T.

In some embodiments, more than one packet is acknowledged at a time; such that a single ACK message may acknowledge the safe receipt of several incoming data packets. In such case, the RTT value measurement is considered to be related to (or associated with) the latest transmitted packet or the most-recently-transmitted packet, out of the set of packets that was acknowledged in such ACK message.

Once a cellular traffic congestion is detected or determined or estimated to currently exist (e.g., with regard to a particular UE or a particular communication flow or communication connection), a Congestion Mitigation Activation Unit 138 operates (e.g., based on a "congestion detected" message or signal that it receives from the Cellular Traffic Congestion Detection Unit 137) to perform, or to trigger the performance of, one or more cellular congestion mitigation (or alleviation, or reduction) operations.

For example, an Applications Classifier Unit 139 may operate to classify or to categorize a particular application (of a congested UE or a congested communication flow or a congested communication connection) as either an Important Application (IA) or a Non-Important Application (NIA). The classification may be performed, for example, based on a pre-defined set of Application Classification Rules 145 or table or lookup table or list or database or criteria, that define which applications (or, which types of applications) should be classified as IA, and conversely, which applications (or, which types of applications) should be classified as NIA. For example, the Application Classification Rules 145 may define that a first particular application (e.g., YouTube) is considered NIA, whereas a second particular application (e.g., Microsoft Teams) is considered IA; or, that applications of a first type (e.g., a web browser when utilized in a browsing session to visit certain types of destinations, such as CNN.com or Amazon.com or Twitter.com) are considered NIA, whereas applications of a second type (e.g., live video conferencing, such as Zoom or Skype or Microsoft Teams) are considered IA.

In some embodiments, the classification of applications or browsing sessions as IA or NIA may be based on classification rules or classification parameters that may be set or configured or defined by the cellular network provider and/or the cellular network operator and/or the entity that provides (or operates, or administers) one or more of the network elements of system 100. In some embodiments, the classification may be based on prioritization rules of the cellular network operator, and/or may reflect goals or constraints of the manner in which the operator would like to run its network. For example, a first cellular network operator may prefer to allocate increased priority to video calls; whereas a second, different, cellular network operator may prefer to allocate increased priority to a regular browsing session in which the end-user consumes static content (e.g., reads online news); whereas a third, different, cellular network operator may also be a content producer or a content provider and may thus prefer to allocated increased priority to its own content.

The assignment of a priority level to an application, or the classification of an application, may be performed in one or more suitable ways. For example, a first solution provider may inform the cellular network operator which particular applications can be identified (e.g., Zoom video conferencing application; Microsoft Teams; Skype; Twitter mobile application; Facebook mobile application; Citibank mobile application); and the may select particular application(s) that would be classified as IA, and would select other particular application(s) that would be classified as NIA. In another example, the cellular network operator may select that all the video conferencing applications would be classified as IA.

Optionally, in some embodiments, a Deep Packet Analysis (DPI) Engine 146 may perform DPI analysis of current and/or previously-transported traffic or packets, to determine which application(s) is (or are) currently associated with a particular currently-congested UE (or communication flow, or communication connection). For example, the identification of the application (or, the identification of the application-type, such as a video conferencing application) may be performed or achieved by the DPI Engine 146. In some embodiments, the DPI engine 146 may further be able to determine, based on DPI analysis, that a particular application (or application-type) is identified, even if it is initialized or runs within a web browser (e.g., identifying that the communication flow is a Zoom video conferencing flow, even if the Zoom video call was initiated from, or runs within, a web browser). For demonstrative purposes, DPI Engine 146 is shown as part of CCMU 130; yet this is a non-limiting example, and the DPI Engine 146 may be located or deployed in other suitable location(s), or may be co-located with or near the CCMU 130, or may otherwise be in operable communication with the CCMU 130. In some embodiments, instead of DPI Engine 146 or in addition to it, other suitable units or mechanisms or methods may be utilized to achieve mapping (or to determine association) between communication flows and UE devices.

A pre-defined set of Congestion Mitigation Rules 147 may be used to indicate which one or more mitigation operations should be applied or deployed or activated or triggered, if it is determined or estimated that the cellular traffic of a particular application (or, of a particular application type, or type-of-application) is congested. For example, the Congestion Mitigation Rules 147 may define or may indicate that the system should perform operations to directly or indirectly improve or increase or enhance (or, to avoid or to minimize degradation of) the QoS or the QoE, for an application that is classified as IA, or for an application-type that is classified as IA; and that such operations should (or can) be performed even if they cause, or even if they may cause, or even if the result would be or may be, a degradation or a reduction in the QoE or QoS of NIA application(s) of that congested UE (or congested communication flow, or congested communication connection). In some embodiments, the indirect effect of the Congestion Mitigation Rules 147 may be, for example, that one or more NIA(s) of a congested UE (or congested communication flow, or congested communication connection) are subject to a reduction or their QoE or QoS, so that indirectly, as a consequence or as a result, one or more IA(s) of that UE (or congested communication flow, or congested communication connection) may benefit and may pick up the freed-up resources to improve their own QoE or QoS.

In accordance with some embodiments, some of the cellular congestion mitigation operations may include, for example: performing shaping or re-shaping of the traffic of a NIA (or of the traffic of all NIAs of a congested UE or flow or connection); forcing or enforcing a particular traffic shape on the traffic of a NIA (or on the traffic of all NIAs of a congested UE or flow or connection); constraining or limiting a NIA to a particular or pre-defined maximum bitrate (e.g., a maximum bitrate value that is lower or smaller than the typical or average bitrate that is consumed by such NIA), in order to free-up or make-available bandwidth or physical resources or PRBs in the congested cell; and such mitigation operation(s) may indirectly affect any one or more IAs of that congested UE (or of that congested communication flow or communication connection), which may now expand the bandwidth that it uses and claim for itself the newly-available bandwidth or the newly-available transmission resources or the recently-freed bandwidth or the recently-freed transmission resources.

In some embodiments, IAs are not directly "touched" or controlled or commanded, or directly modified or directly configured, by the system of the present invention, or by its components, or by the congestion mitigation operations or the congestion management operations that are enforced or activated or deployed by the component(s) of the present invention. Rather, the system of the present invention, and its units or component, operate to only shape or re-shape the traffic of NIAs, and allow the IAs to autonomously claim for their own usage any freed-up or freshly-available transmission resources that were freed up at the congested cell (or at its eNodeB 115) due to the shaping or re-shaping of the traffic of the NIA(s), or due to constraining or limiting the bitrate of such NIA(s). Optionally, some embodiments of the present invention may utilize one or more modules or units to smoothen the shape of traffic of an IA, or to create bursts in the delivery of packets from an IA; however, such operations are not part of the congestion management operation or the congestion reduction operations that are dynamically deployed by the system of the present invention and which are directed towards NIAs, rather than towards IAs directly.

In some embodiments, bitrate reduction or bitrate limiting or bitrate constraining may be achieved, for example, by passing the relevant traffic through a "tap" mechanism or a filtering mechanism which does not allow bits to pass faster than a particular bitrate. In some implementation, the application that runs on the UE device may automatically adapt its operation to the network-enforced bitrate limit; for example, a video streaming application may automatically adjust its operation by dropping some video frames, or by dropping an entire video feed for a temporary period (and maintaining only the audio feed), or by reducing the resolution or the frame rate; or by performing other operations to adapt to bandwidth limitations, in the transport layer or in the application layer. In some embodiments, an NIA application that is not configured to adjust or to adapt its operation to a limited bandwidth, may undergo a severe reduction in the QoE or QoS; however, such NIA was pre-defined by the cellular network provider as an NIA, and therefore its QoS or QoE degradation is generally expected and is generally acceptable from the network operator's point of view.

In accordance with the present invention, the system performs dynamic shaping or dynamic re-shaping of the traffic of NIAs of a congested UE (or of a congested communication flow, or of a congested communication connection); for example, to force or to enforce on them a particular bitrate limit or bitrate constraint or a maximum allowed bitrate. The shaping operations of the traffic of each NIA of a congested UE (or, of a congested communication flow or a congested communication connection), begin immediately and automatically upon the detection that this UE (or this communication flow, or this communication connection) is currently experiencing cellular traffic congestion. The shaping operations of the traffic of an NIA are stopped immediately upon detection that the associated UE (or communication flow, or communication connection) is no longer experiencing cellular traffic congestion, namely, immediately upon detection of exit from cellular congested state or detection that a previously-detected cellular traffic congestion has ended or was removed. The traffic shaping operations may be performed, or enforced, or triggered, by a Traffic Shaping Unit 155; which may be located or co-located at the CCMU 130 or near the CCMU 130. Optionally, the Traffic Shaping Unit 155 (which may also be a traffic re-shaping unit, or a traffic shape modification unit; as it may operate to cause a modification of already-shaped traffic) may include, or may be associated with, one or more other sub-units or modules; for example, a Bitrate Reduction Unit 156, which may operate to reduce or decrease or lower the bitrate that is utilized by a particular NIA of a particular UE (or communication flow, or communication connection); a Bitrate Limiting Unit 157, which may operate to limit or constrain the bitrate that is utilized by a particular NIA of a particular UE (or communication flow, or communication connection); or other suitable sub-units or modules.

In some embodiments, the shaping of traffic of a NIA may be performed while taking into account whether or not the NIA is also a "guaranteed bitrate" application (or, whether or not the NIA is also a "guaranteed minimum bitrate" application); such as, based on a pre-defined list or table or lookup table or rules, that define a particular NIA as having a particular value of guaranteed bitrate. For example, a NIA that is not a "guaranteed bitrate" application, may be subject to more aggressive traffic shaping operations, or may be subject to an increased level of traffic shaping operations (which, in some situations, may even cause such NIA to completely disconnect). In contrast, a NIA that does have a "guaranteed bitrate" associated with it, is not traffic-shaped in an aggressive manner, or, would be subject to less aggressive traffic-shaping operations. For example, a NIA that has a "guaranteed bitrate" associated with it (e.g., of R bits-per-second), would be subject to traffic shaping operations (e.g., bitrate reduction operations) that reduce the bitrate of its traffic until such reduced bitrate reaches the "guaranteed bitrate" value, without dipping below it; whereas, in contrast, a NIA that does not have a "guaranteed bitrate" associated with it, would be subject to traffic shaping operations (e.g., bitrate reduction operations) that reduce the bitrate of its traffic without any limit on such bitrate reduction, and the bitrate of such NIA may be reduced (in some situations) to zero, or to $\frac{1}{4}$ or $\frac{1}{8}$ or $\frac{1}{10}$ of the regularly-consumed bitrate of such NIA. In some implementations, it is possible that in a particular situation, the bandwidth of a cell cannot accommodate the sum of all the bitrates of the NIAs that have a guaranteed bitrate; and in such case, congestion mitigation operations would not be applied to such NIAs, in order to respect the bitrate guarantee(s) of such NIA(s).

In some embodiments, the traffic shaping operations (or, the bitrate reduction operations) that are applied to cellular traffic of a NIA of a congested UE (or of a congested communication flow, or of a congested communication connection), may take into account whether the shaping should be performed into pre-defined lower bitrates or into arbitrary (non-pre-defined) lower bitrates. For example, some NIAs, such as a video streaming application, utilize several alternate bitrates having pre-defined specific values, such that the bitrates that are available for video streaming delivery exist only in accordance with a pre-defined set of bitrate values (e.g., based on pre-defined values, which may be configured or suggested by the system administrator or the solution provider, and which may then be approved explicitly or implicitly by the cellular network operator); and for such NIA, it would not be efficient to perform traffic shaping or bitrate reduction into an "interim" bitrate value (e.g., a bitrate value that is not equal to one of the NIA-approved or NIA-utilized bitrate values), since that NIA cannot efficiently utilize the entirety of such "interim" bitrate; and an attempt to enforce such arbitrary or interim bitrate value on such NIA would yield an inefficient waste of bitrate and reduced QoE or reduced QoS. In contrast, a NIA that is a file transfer application or is a Web browser application, can often be traffic-shaped to virtually any arbitrary value of reduced bitrate (e.g., the file would be transferred very slowly; the web-page would load very slowly).

In some embodiments, the traffic shaping (or the bitrate reduction, or the bitrate limiting) operations of the NIA(s) may be performed to enforce a particular target bitrate value that is determined by the Traffic Shaping Unit 155 in relation to (or, by taking into account; or based on) the current bitrate that is consumed by the NIA (e.g., as the bitrate may be measured, substantially continuously, by a Bitrate Measuring Unit 158) or by the particular UE or communication flow or communication connection, and/or by taking into account the BD value (or, the change or the recent increase in the BD value). For example, the target bitrate value need not necessarily be predefined for a particular NIA (unless the NIA is pre-configured to operate only at certain pre-defined discrete values of bitrate); but rather, the target bitrate value for the NIA is dynamically determined or calculated by the Traffic Shaping Unit 155. For example, a lower value for a target bitrate value is enforced and utilized, and the traffic shaping of the NIA is stronger or is more aggressive or more extensive, or the decrease in the bitrate is greater, when the recent increase in Buffer Delay (BD) is greater. In some implementations, as a demonstrative example, an "aggressive" bitrate reduction may be a reduction to less than 40% of the original bitrate; whereas a "non-aggressive" bitrate reduction may be a reduction to approximately 75% of the original bitrate; these are only non-limiting examples, and other threshold values may be configured and/or utilized.

In accordance with some embodiments, when the system detects or determines that a particular UE is experiencing cellular traffic congestion, the system does not necessarily perform operations to directly assist that particular UE to directly mitigate its congestion; but rather, the system causes a modification of operational behavior of NIAs, running on that particular UE and running on other UEs in that may or may not be on the same cell; thereby causing IAs that run on that particular UE, and IAs that run on other UEs in that same cell, to consume such freed-up bandwidth or PRBs and increase or improve (or at least maintain, and not degrade) their own QoE or QoS. For example, CCMU 130 determines that UE 111 is currently experiencing cellular traffic congestion. CCMU 130 thus determines that most probably there is a congested cell in the cellular network. CCMU 130 does not know, and does not need to know, and does not attempt to determine, which particular cell is the congested cell. Furthermore, CCMU 130 does not know, and does not need to know, and does not attempt to determine, which other UEs share that congested cell. Nevertheless, CCMU 130 and system 100 now operate under the working assumption that there exists a congested cell, and that UE 111 is sharing that congested cell. Therefore, CCMU 130 operates to alleviate or mitigate the congestion condition in that unknown congested cell. This is achieved by reducing the bitrate that is consumed by NIAs of that particular UE 111; as this specific bitrate reduction is expected to assist the IAs of UE 111 itself and/or the IAs of other UEs that share that same unknown congested cell. The system operates to lower the bitrate of NIA(s), thereby improving both (i) the QoE or QoS of IA(s) in the same UE, and (ii) the QoE or QoS of IA(s) in other UEs that share the same unknown congested cell; without knowing which other UEs share that same unknown congested cell; and without knowing whether that particular UE has any IA(s) running; and without knowing whether the other UEs have any IA(s) running; the system thus assisting IAs without even knowing for certain whether they currently exist, or on which UEs they are running, or how many such IAs are currently running.

In a demonstrative example, CCMU 130 determines that UE 111 is currently experiencing cellular traffic congestion. The Applicants have realized that there are three possible situations in this demonstrative example.

In Situation 1, the UE 111 has only NIA(s) running and consuming bandwidth or PRBs; and the UE 111 has no IAs running or consuming PRBs. Therefore, system 100 causes the NIAs that run on UE 111 to reduce the bitrate that they consume. This, in turn, frees up bandwidth (or PRBs) in that unknown congested cells; and the freed-up bandwidth (or PRBs) can now be "grabbed" or "picked up" and consumed by the other UEs that happen to be sharing that same unknown congested cell; and particularly, by the IA(s) that are running on those other UEs. It does not matter which applications are running on those other UEs, or whether those applications (that run on those other UEs) are IAs or NIAs.

In Situation 2, the UE 111 has only IA(s) running and consuming bandwidth or PRBs; and the UE 111 has no NIAs running or consuming PRBs. System 100 does not reduce the bitrate of an IA; therefore, the bitrate values of the IA(s) running on UE 111 are not reduced by the system. Rather, the system utilizes a working assumption, that there exist other UEs in the same unknown congested cell; and the system expects to detect those other UEs as experiencing congestion; and if those other UEs have NIA(s) running and consuming bandwidth, then it is expected that the bitrate of those NIA(s) of those other UEs will soon be lowered (as described in Situation 1), thereby freeing-up bandwidth (or PRBs) for consumption by the IAs of the UE 111 (and by other IAs of those other UEs). If it turns out that none of those other UEs have any NIA(s), then the system does not reduce bitrate of any application, and the current performance of the system is maintained in order to preserve the total throughput.

In Situation 3, the UE 111 has: one or more NIA(s) running and consuming bandwidth (and PRBs), and also, one or more IA(s) running and consuming bandwidth (and PRBs). The system causes a bitrate reduction to the NIA(s) that are running on the UE 111. As a result, some bandwidth (and PRBs) in that unknown congested cell are freed-up. This, in turn, benefits the IA(s) running on the UE 111, and also benefits the other UEs that share the same unknown congested cell.

The Applicants have realized that some conventional systems, that attempt to handle traffic congestion, take an approach of: (a) determining the amount of bandwidth that is available; (b) determining which specific UEs require increased bandwidth, including by specifically identifying each such UE; (c) then, re-allocating or re-dividing the determined available bandwidth, among the specific and known (identified) UEs based on their actual (known) needs. In contrast, some embodiments of the present invention do not know, and do not need to know, and do not rely upon and do not depend on determining or utilizing, the total amount of bandwidth that is available, or that is effectively available, for any UE and/or for a group or set of UEs or for a particular cell of the cellular network. Some embodiments of the present invention do not know, and do not need to know, and do not rely upon and do not depend on determining or utilizing, the number and/or location of UEs that are currently experiencing cellular traffic congestion, and/or the number and/or location of UEs that are currently not experiencing cellular traffic congestion. Some embodiments of the present invention do not know, and do not need to know, and do not rely upon and do not depend on determining or utilizing, the specific identity of which particular UEs are located or are co-located in the same cellular network cell. Some embodiments of the present invention do not know, and do not need to know, and do not rely upon and do not depend on determining or utilizing, which particular identity (or geo-location) of the cell of the cellular network that is currently congested, or has at least N devices (or, at least N percent of operational devices) that are experiencing cellular traffic congestion. Some embodiments of the present invention do not know, and do not need to know, and do not rely upon and do not depend on determining or utilizing, whether a particular UE is running an Important Application (IA) that is currently suffering from cellular traffic congestion; but rather, in some embodiments it may suffice to estimate remotely, that a particular UE is currently experiencing cellular traffic congestion, regardless of whether that particular UE is running an Important Application or a Non-Important Application. Some embodiments of the present invention do not perform, and do not need to perform, an estimation of the current bandwidth needs or the current bandwidth needs of a particular UE, in order to take further operations to directly increase the bandwidth that is available to that particular UE; but rather, once a particular UE is remotely estimated to be experiencing cellular traffic congestion, that particular UE is remotely undergoing a bitrate-constraining process or a bitrate-reduction process or a bitrate-limiting process which is selectively deployed or activated only with regard to Non-Important Applications of that particular UE, in order to indirectly cause a benefit to Important Applications which may (or may not) be running on other UE devices that happen to be in the same cellular network cell as that particular UE, without knowing or determining the existence and/or the location and/or the identity of such other UE devices, and/or without knowing or determining or utilizing the bandwidth consumption and/or the bandwidth requirements of such other UE devices. Some embodiments of the present invention operate without estimating and summing-up the bandwidth requirements of multiple UEs, and without dividing or re-dividing or allocating or re-allocating any "total available bandwidth" among such multiple UEs based on their "estimated bandwidth needs". Some embodiments of the present invention operate by determining that a particular UE is currently experiencing cellular traffic congestion; and by directly bitrate-limiting or bitrate-constraining, remotely and selectively, only the communication flows that are remotely identified or remotely mapped to correspond to Non-Important Applications of that particular UE; in order to indirectly cause a benefit, or freeing-up PRBs and bandwidth in that particular cell of the cellular network (without knowing, at all, which particular cell it is, or where this particular cell is located or geo-located, or which other UEs are currently serviced by that particular cell, or what are the number or the identity or the "bandwidth needs" of any such other UEs that happen to be currently serviced by that particular cell of the cellular network).

Embodiments of the present invention operate in an entirely different way, from a conventional system which merely attempts to actively modify a version of a file (or a video stream, or other content) that is served to a particular UE, based on the current actual bandwidth that is estimated for that particular UE or that is reported or indicated by that particular UE. For example, some conventional systems may include a server (e.g., similar to a YouTube server) which stores multiple pre-encoded versions of the same video content (e.g., a low-bitrate 360p version, and a high-bitrate 1080p version, of the same video); and which detects that an attempt to serve the high-bitrate version to a particular UE, causes that particular UE to experience low-quality video consumption (e.g., dropped frames, paused video playback); and thus causes such server, which serves the video content, to switch from serving to that particular UE the high-bitrate (1080p) version of the video, to serving to that particular UE the low-bitrate (360p) version of that video. Such conventional system has nothing to do with, and is not similar at all, to the components and methods of the present invention. Embodiments of the present invention do not store and do not create, and do not utilize multiple and do not serve, two or more multiple versions of the same video content; and do not switch and do not attempt to switch, from serving a high-bitrate version of a particular video to a particular UE to serving a low-video version of that video to that particular UE; and do not attempt to estimate or to detect the current bandwidth needs of a particular UE, or of a particular application (or communication flow) of a particular UE; and do not configure or modify the operation of the serving entity which serves or sends or transmits the content to the particular UE. Furthermore, some embodiments of the present invention, may indirectly cause a Non-Important Application to undergo, remotely and selectively, via a bitrate-limiting or bitrate-constraining or bitrate-reducing pass-through filtering process, a reduction in the pass-through bitrate of a communication flow that is remotely determined to be associated with a Non-Important Application (e.g., which may be a YouTube streaming video application), in order to indirectly cause a free-up of PRBs in a particular (and unknown) cell of the cellular network (in which that particular UE is currently located and serviced), such that Important Application(s), if they exist and if they are running on that particular UE and/or on other UEs that happen to be located in (serviced by) that same cellular network cell (whose identity and/or location are unknown and are not determined and are not relied upon) would benefit by picking-up or "grabbing" or utilizing such freed-up PRBs or such freed-up bandwidth.

In a demonstrative example or a demonstrative implementation, and in contrast to conventional systems: (i) a YouTube video streaming application may be pre-defined as a Non-Important Application; (ii) a Zoom video streaming application may be pre-defined as an Important Application; (iii) the system of the present invention may remotely estimate, that a First UE is currently experiencing cellular traffic congestion; (iv) the system then selectively and remotely applies bitrate-limiting or bitrate-constraining, via a remote pass-through filtering unit or mechanism, only to communication flows that are remotely determined to be associated with the Non-Important Application (e.g., the YouTube streaming video application) of that particular First UE; and thus, (v) thereby causing an indirect benefit to the QoS or the QoE that an Important Application (e.g., the Zoom video streaming application) would provide to a Second UE that happens to be located in (serviced by) the same cell of the same cellular network as the First UE, without determining or knowing the identity and/or the existence and/or the bandwidth needs of such other Second UE and/or of its Important Application(s), if any.

Embodiments of the present invention are different from a conventional system which performs "bandwidth throttling". For example, in a conventional "bandwidth throttling" system, a bandwidth throttling unit or an Internet Service Provider (ISP) operates to intentionally slowing-down an Internet service by throttling the bandwidth that is supplied to a particular ISP subscriber. A conventional bandwidth throttling unit of an ISP attempts to intentionally damage or hurt the QoS or the QoE of a particular ISP subscriber, and attempt to minimize the bandwidth that is utilized by such ISP subscriber (e.g., in order to limit or to dis-incentivize or to deter an activity of the ISP subscriber, such as peer-to-peer (P2P) file sharing). In contrast, embodiments of the present invention do not attempt, and do not cause, a dis-incentive or to deter a particular UE from utilizing a particular application or service. Furthermore, embodiments of the present invention operate to selectively enforce a bitrate-limiting filtering process only towards particular communication flows that are identified as associated with pre-defined Non-Important Applications, rather than with any communication flows of a particular subscriber (which may include traffic of Important Applications, which is not being subject to bitrate-limiting by embodiments of the present invention). Additionally, embodiments of the present invention deploy or activate the bitrate-limiting mechanism, selectively and only towards communication flows that are identified as associated with Non-Important Applications of a particular UE device, only in response to a remote detection or a remote estimate that said particular UE device is currently suffering from actual and current cellular traffic congestion. Furthermore, embodiments of the present invention operate in a cellular network and on cellular traffic and on cellular communication flows, in contrast with bandwidth throttling of Internet traffic by an Internet Service Provider (ISP). Additionally, embodiments of the present invention do incentivize the full utilization of available cellular resources and PBRs, by Important Applications that are running on a UE devices that do suffer from cellular traffic congestion; in contrast with a conventional ISP system that blindly and agnostically enforces bandwidth limitations on an Internet subscriber, hurting the performance of both its important applications and its non-important applications, and de facto limiting the bandwidth consumed by both his important applications and its non-important applications, and deterring (and sometimes, or often, preventing) such subscriber from utilizing the full quota of bandwidth that can (physically) be utilized. Furthermore, a conventional bandwidth throttling is typically performed at ISP servers, by limiting the number of requests that the ISP server is allowed to receive per time-unit; whereas embodiments of the present invention operate differently, by selectively enforcing a bitrate-limiting pass-through filtering process at a network node located between the cellular core network and the Internet (or the Internet entry node or the Internet connection node). Finally, embodiments of the present invention may activate and enforce the bitrate-limiting pass-through process on selected cellular communication flows for only a few seconds, or for short time periods (e.g., measured in seconds or in minutes, and not in hours or days), and de-activate or turn-off the bitrate-limiting pass-through process on cellular traffic of communication flows of Non-Important Applications upon remote detection (or remote estimation) that the cellular traffic congestion, which has previously been remotely estimated or remotely detected for a particular UE in the cellular network, has been mitigated or alleviated, or that such cellular traffic congestion no longer exists.

Some embodiments include a system comprising: a Cellular Congestion Management Unit, operable to mitigate cellular traffic congestion that one or more User Equipment (UE) devices experience in a cellular communication network. The cellular communication network comprises at least a first UE and a second UE. The Cellular Congestion Management Unit comprises: (a) an Applications Classification Unit, to define that a first application is considered an Important Application, and to define that a second application is considered a Non-Important Application; (b) a Cellular Traffic Congestion Detection Unit, to measure and to monitor one or more parameters related to traffic transmitted by or sent to the first UE, and to remotely generate an estimate that the first UE is currently experiencing cellular traffic congestion; wherein said estimate that the first UE is currently experiencing cellular traffic congestion, is generated remotely from said first UE and remotely from the second UE, and without knowledge of which particular cellular network cell is currently being utilized by the first UE or by the second UE; (c) a Deep Packet Inspection (DPI) Engine, to perform DPI analysis of cellular data packets that are transmitted by and sent to the first UE; and to determine, based on DPI analysis, that the first UE is currently utilizing a first communication flow that is associated with an Important Application; and to further determine, based on DPI analysis, that the first UE is currently utilizing a second communication flow that is associated with a Non-Important Application; (d) a Bitrate Limiting Unit, to remotely and selectively enforce filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE. Remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE. The remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

In some embodiments, the first communication flow of the first UE (that is associated with the Important Application), and the second communication flow of the first UE (that is associated with the Non-Important Application), are two communication flows that are being transported or are being delivered concurrently, or at least partially concurrently or partially simultaneously, or in parallel, or during at least one overlapping time-slot or time-period, through said system and/or through said Cellular Base Station and/or through said Cellular Congestion Management Unit. Accordingly, the selective and remote enforcement of bitrate limiting is applied, selectively and remotely, on the second communication flow (that is associated with the Non-Important Application) of the first UE, while concurrently, bitrate limiting is not applied on the first communication flow (that is associated with the Important Application) of the first UE.

In some embodiments, the Cellular Congestion Management Unit is connected remotely from said first UE and remotely from said second UE, and is connected and is operable at a network node located between a Packet Data Network Gateway (PGW) and an entry node of the Internet. In some embodiments, the Cellular Congestion Management Unit operates without obtaining or analyzing any sender-side data from any transmitting entity that sent data to said first UE or to said second UE.

In some embodiments, the Cellular Congestion Management Unit comprises: a Round Trip Time (RTT) measuring unit, to remotely estimate a current RTT time-duration value associated with current communications of said first UE; wherein the Cellular Congestion Management Unit is to remotely estimate that said first UE is currently experiencing cellular traffic congestion based on an analysis that takes into account at least: a comparison between (i) the current RTT time-duration value that was remotely estimated by the RTT measuring unit, and (ii) a baseline RTT value that was previously determined for said cellular network operating in a non-congested state.

In some embodiments, the Cellular Congestion Management Unit comprises: a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the Cellular Congestion Management Unit is to remotely estimate that said first UE is currently experiencing cellular traffic congestion based on an analysis that takes into account at least: a comparison between (i) the current BD value that was remotely estimated by the BD measuring unit, and (ii) a baseline BD value that was previously determined for said cellular network operating in a non-congested state.

In some embodiments, the Cellular Congestion Management Unit comprises: a Data-in-Flight (DiF) measuring unit, to remotely estimate a current DiF quantity, in packets or in bits, of cellular data that is pending for transport at a Cellular Base Station buffer of a Cellular Base Station of said cellular network; wherein the Cellular Congestion Management Unit is to remotely estimate that said first UE is currently experiencing cellular traffic congestion based on an analysis that takes into account at least: a comparison between (i) the current DiF quantity that was remotely estimated by the DiF measuring unit, and (ii) a baseline DiF value that was previously determined for said cellular network operating in a non-congested state.

In some embodiments, the Cellular Congestion Management Unit comprises: a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the Cellular Congestion Management Unit is to remotely estimate that said first UE is currently experiencing cellular traffic congestion based on an analysis that takes into account at least: a checking whether a current BD value is greater than a previously-measured BD value; wherein a positive result of said checking contributes to an estimate that said first UE is currently experiencing cellular traffic congestion.

In some embodiments, the Cellular Congestion Management Unit comprises: (a) a Round Trip Time (RTT) measuring unit, to remotely estimate a current RTT time-duration value associated with current communications of said first UE; (b) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the BD measuring unit further performs a checking whether a current BD value is greater than a previously-measured BD value; (c) a Data-in-Flight (DiF) measuring unit, to remotely estimate a current DiF quantity, in packets or in bits, of cellular data that is pending for transport at said Cellular Base Station buffer of said Cellular Base Station of said cellular network; wherein the Cellular Congestion Management Unit is to remotely estimate that said first UE is currently experiencing cellular traffic congestion based on an analysis that takes into account at least: (i) the current RTT time-duration value that was remotely estimated by the RTT measuring unit, and (ii) the current Buffer Delay (BD) value that was remotely estimated by the BD measuring unit, and (iii) a trend-of-change in BD value that indicates whether the BD value has recently increased or decreased, and (iv) the current quantity of Data-in-Flight (DiF) that was remotely estimated by said DiF measuring unit.

In some embodiments, the Cellular Congestion Management Unit comprises: (a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the BD measuring unit further performs a checking whether a current BD value is greater than a previously-measured BD value; (b) a Data-in-Flight (DiF) measuring unit, to remotely estimate a current DiF quantity, in packets or in bits, of cellular data that is pending for transport at said Cellular Base Station buffer of said Cellular Base Station of said cellular network; wherein the Cellular Congestion Management Unit is to remotely estimate that said first UE is currently experiencing cellular traffic congestion based on an analysis that takes into account at least: (i) the current Buffer Delay (BD) value that was remotely estimated by the BD measuring unit, and (ii) a trend-of-change in BD value that indicates that the BD value has recently increased, and (iii) the current quantity of Data-in-Flight (DiF) that was remotely estimated by said DiF measuring unit.

In some embodiments, the Cellular Congestion Management Unit comprises: (a) a Buffer Delay (BD) measuring unit, to remotely estimate a current BD value which corresponds to a time-duration value of a time-delay in transport of packets that are temporarily buffered at a Cellular Base Station buffer of a Cellular Base Station that of said cellular network; wherein the BD measuring unit further performs a checking whether a current BD value is greater than a previously-measured BD value; (b) a Data-in-Flight (DiF) measuring unit, to remotely estimate a current DiF quantity, in packets or in bits, of cellular data that is pending for transport at said Cellular Base Station buffer of said Cellular Base Station of said cellular network; wherein the Cellular Congestion Management Unit is to remotely estimate that said first UE is no longer experiencing a previously-detected cellular traffic congestion; based on an analysis that takes into account at least: (i) the current Buffer Delay (BD) value that was remotely estimated by the BD measuring unit, and (ii) a trend-of-change in BD value that indicates that the BD value has recently decreased, and (iii) the current quantity of Data-in-Flight (DiF) that was remotely estimated by said DiF measuring unit.

In some embodiments, the Cellular Congestion Management Unit comprises: (a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the BD measuring unit further performs a checking whether a current BD value is greater than a previously-measured BD value; (b) a Data-in-Flight (DiF) measuring unit, to remotely estimate a current DiF quantity, in packets or in bits, of cellular data that is pending for transport at said Cellular Base Station buffer of said Cellular Base Station of said cellular network; wherein the Cellular Congestion Management Unit is to remotely estimate that said first UE is currently experiencing cellular traffic congestion based on an analysis that takes into account at least: (i) a determination that the current Buffer Delay (BD) value that was remotely estimated by the BD measuring unit is greater than T milliseconds, wherein T is a pre-defined threshold value; and (ii) a determination that a trend-of-change in BD value that indicates that the most-recently-measured BD value is greater than the BD value that was measured immediately before it, and (iii) a determination that the current quantity of Data-in-Flight (DiF) that was remotely estimated by said DiF measuring unit is at least P packets, wherein P is a pre-defined threshold value.

In some embodiments, the Cellular Congestion Management Unit comprises: (a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the BD measuring unit further performs a checking whether a current BD value is greater than a previously-measured BD value; (b) a Data-in-Flight (DiF) measuring unit, to remotely estimate a current DiF quantity, in packets or in bits, of cellular data that is pending for transport at said Cellular Base Station buffer of said Cellular Base Station of said cellular network; wherein the Cellular Congestion Management Unit is to remotely estimate that said first UE is no longer experiencing a previously-detected cellular traffic congestion, based on an analysis that takes into account at least: (i) a determination that the current Buffer Delay (BD) value that was remotely estimated by the BD measuring unit is smaller than T milliseconds, wherein T is a pre-defined threshold value; and (ii) a determination that a trend-of-change in BD value that indicates that the most-recently-measured BD value is smaller than the BD value that was measured immediately before it.

In some embodiments, the system comprises: an Application Classification Unit, to remotely perform a classification of a communication flow of said particular UE, as either an Important Application or a Non-Important Application; a Traffic Shaping Unit, to remotely deploy traffic shaping only towards all traffic of all Non-Important Applications of said particular UE and not towards any traffic of any Important Applications of said particular UE.

In some embodiments, the Application Classification Unit performs said classification by utilizing said Deep Packet Inspection (DPI) engine that analyzes traffic and classifies traffic into Important Applications or Non-Important Applications by using at least one of: (i) a pre-defined lookup table, (ii) pre-defined application classification rules.

In some embodiments, the Traffic Shaping Unit is to remotely deploy said traffic shaping only towards (i) all the Non-Important Applications of said first UE and also towards (ii) all the Non-Important Applications of said first UE.

In some embodiments, the Traffic Shaping Unit is to remotely deploy said traffic shaping only towards (i) all the Non-Important Applications of said first UE and also towards (ii) all the Non-Important Applications of said first UE; wherein selective and application-based deployment of said traffic shaping towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE and mitigate cellular traffic congestion of Important Applications of said first UE.

In some embodiments, the Traffic Shaping Unit is to remotely deploy a Bitrate Limiting process only towards (i) all the Non-Important Applications of said first UE and also towards (ii) all the Non-Important Applications of said first UE; wherein selective and application-based deployment of said Bitrate Limiting process only towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE, and mitigate cellular traffic congestion of Important Applications of said first UE.

In some embodiments, a Bitrate Limiting process is selectively applied on a per-application basis only towards (i) all the Non-Important Applications of said first UE and also towards (ii) all the Non-Important Applications of said first UE; wherein said Bitrate Limiting process is a Bitrate Limiting process that constrains a transmission bitrate, that is allocated to a particular Non-Important Application, to one or more discrete and specific constrained-bitrate values that are pre-defined for a particular Non-Important Application, and does not utilize an arbitrary target bitrate as a bitrate constraint for the transmission bitrate that is allocated to said particular Non-Important Application.

In some embodiments, the Cellular Congestion Management Unit comprises: a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network; wherein the Cellular Congestion Management Unit is to remotely estimate that said first UE is currently experiencing cellular traffic congestion based on an analysis that takes into account at least: a comparison between (i) the current BD value that was remotely estimated by the BD measuring unit, and (ii) a baseline BD value that was previously determined for said cellular network operating in a non-congested state; wherein the system further comprises: a Traffic Shaping Unit is to remotely and selectively deploy an application-aware Bitrate Limiting process only towards (i) all the Non-Important Applications of said first UE and also towards (ii) all the Non-Important Applications of said first UE; wherein deployment of said application-aware Bitrate Limiting process only towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE, and mitigate cellular traffic congestion of Important Applications of said first UE; wherein a Bitrate Limiting constraint, that is enforced by said Bitrate Limiting process, is determined by utilizing an inverse relation to a size of the current Buffer Delay (BD) value that was remotely estimated by the BD measuring unit; wherein a greater value of current Buffer Delay (BD) value triggers utilization of a lower value of the Bitrate Limiting constraint; wherein a smaller value of current Buffer Delay (BD) value triggers utilization of a greater value of the Bitrate Limiting constraint.

Some embodiments include a method comprising: mitigating cellular traffic congestion, that one or more User Equipment (UE) devices experience in a cellular communication network; wherein the cellular communication network comprises at least a first UE and a second UE; wherein said mitigating comprises: (a) defining that a first application is considered an Important Application, and defining that a second application is considered a Non-Important Application; (b) measuring and monitoring one or more parameters related to traffic transmitted by or sent to the first UE, and remotely generating an estimate that the first UE is currently experiencing cellular traffic congestion; wherein said estimate that the first UE is currently experiencing cellular traffic congestion, is generated remotely from said first UE and remotely from the second UE, and without knowledge of which particular cellular network cell is currently being utilized by the first UE or by the second UE; (c) at a Deep Packet Inspection (DPI) Engine, performing DPI analysis of cellular data packets that are transmitted by and sent to the first UE; and determining, based on DPI analysis, that the first UE is currently utilizing a first communication flow that is associated with an Important Application; and further determining, based on DPI analysis, that the first UE is currently utilizing a second communication flow that is associated with a Non-Important Application; (d) at a Bitrate Limiting Unit, remotely and selectively enforcing filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE; wherein remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE; wherein the remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

Some embodiments include a non-transitory storage medium or storage article having stored thereon instruction that, when executed by a processor, cause the processor to perform a method as described.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
    a Cellular Congestion Management Unit, operable to mitigate cellular traffic congestion that one or more User Equipment (UE) devices experience in a cellular communication network;
    wherein the cellular communication network comprises at least a first UE and a second UE;
    wherein the Cellular Congestion Management Unit comprises:
    (a) an Applications Classification Unit, to define that a first application is considered an Important Application, and to define that a second application is considered a Non-Important Application;
    (b) a Cellular Traffic Congestion Detection Unit, to measure and to monitor one or more parameters related to traffic transmitted by or sent to the first UE, and to remotely generate an estimate that the first UE is currently experiencing cellular traffic congestion;
        wherein said estimate that the first UE is currently experiencing cellular traffic congestion, is generated remotely from said first UE and remotely from the second UE, and without knowledge of which particular cellular network cell is currently being utilized by the first UE or by the second UE;
    (c) a Deep Packet Inspection (DPI) Engine, to perform DPI analysis of cellular data packets that are transmitted by and sent to the first UE;
        and to determine, based on DPI analysis, that the first UE is currently utilizing a first communication flow that is associated with an Important Application;
        and to further determine, based on DPI analysis, that the first UE is currently utilizing a second communication flow that is associated with a Non-Important Application;
    (d) a Bitrate Limiting Unit, to remotely and selectively enforce filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE;
        wherein remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE;
        wherein the remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

2. The system of claim 1,
    wherein the Cellular Congestion Management Unit is connected remotely from said first UE and remotely from said second UE, and is connected and is operable at a network node located between a Packet Data Network Gateway (PGW) and an entry node of the Internet;

wherein the Cellular Congestion Management Unit operates without obtaining or analyzing any sender-side data from any transmitting entity that sent data to said first UE or to said second UE.

3. The system of claim 1, wherein the Cellular Congestion Management Unit comprises:

a Round Trip Time (RTT) measuring unit, to remotely estimate a current RTT time-duration value associated with current communications of said first UE;

wherein the Cellular Congestion Management Unit is to remotely estimate that said first UE is currently experiencing cellular traffic congestion based on an analysis that takes into account at least: a comparison between (i) the current RTT time-duration value that was remotely estimated by the RTT measuring unit, and (ii) a baseline RTT value that was previously determined for said cellular network operating in a non-congested state.

4. The system of claim 1, wherein the Cellular Congestion Management Unit comprises:

a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;

wherein the Cellular Congestion Management Unit is to remotely estimate that said first UE is currently experiencing cellular traffic congestion based on an analysis that takes into account at least: a comparison between (i) the current BD value that was remotely estimated by the BD measuring unit, and (ii) a baseline BD value that was previously determined for said cellular network operating in a non-congested state.

5. The system of claim 1, wherein the Cellular Congestion Management Unit comprises:

a Data-in-Flight (DiF) measuring unit, to remotely estimate a current DiF quantity, in packets or in bits, of cellular data that is pending for transport at a Cellular Base Station buffer of a Cellular Base Station of said cellular network;

wherein the Cellular Congestion Management Unit is to remotely estimate that said first UE is currently experiencing cellular traffic congestion based on an analysis that takes into account at least: a comparison between (i) the current DiF quantity that was remotely estimated by the DiF measuring unit, and (ii) a baseline DiF value that was previously determined for said cellular network operating in a non-congested state.

6. The system of claim 1, wherein the Cellular Congestion Management Unit comprises:

a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;

wherein the Cellular Congestion Management Unit is to remotely estimate that said first UE is currently experiencing cellular traffic congestion based on an analysis that takes into account at least: a checking whether a current BD value is greater than a previously-measured BD value, wherein a positive result of said checking contributes to an estimate that said first UE is currently experiencing cellular traffic congestion.

7. The system of claim 1, wherein the Cellular Congestion Management Unit comprises:

(a) a Round Trip Time (RTT) measuring unit, to remotely estimate a current RTT time-duration value associated with current communications of said first UE;

(b) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;

wherein the BD measuring unit further performs a checking whether a current BD value is greater than a previously-measured BD value, (c) a Data-in-Flight (DiF) measuring unit, to remotely estimate a current DiF quantity, in packets or in bits, of cellular data that is pending for transport at said Cellular Base Station buffer of said Cellular Base Station of said cellular network;

wherein the Cellular Congestion Management Unit is to remotely estimate that said first UE is currently experiencing cellular traffic congestion based on an analysis that takes into account at least: (i) the current RTT time-duration value that was remotely estimated by the RTT measuring unit, and (ii) the current Buffer Delay (BD) value that was remotely estimated by the BD measuring unit, and (iii) a trend-of-change in BD value that indicates whether the BD value has recently increased or decreased, and (iv) the current quantity of Data-in-Flight (DiF) that was remotely estimated by said DiF measuring unit.

8. The system of claim 1, wherein the Cellular Congestion Management Unit comprises:

(a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;

wherein the BD measuring unit further performs a checking whether a current BD value is greater than a previously-measured BD value, (b) a Data-in-Flight (DiF) measuring unit, to remotely estimate a current DiF quantity, in packets or in bits, of cellular data that is pending for transport at said Cellular Base Station buffer of said Cellular Base Station of said cellular network;

wherein the Cellular Congestion Management Unit is to remotely estimate that said first UE is currently experiencing cellular traffic congestion based on an analysis that takes into account at least: (i) the current Buffer Delay (BD) value that was remotely estimated by the BD measuring unit, and (ii) a trend-of-change in BD value that indicates that the BD value has recently increased, and (iii) the current quantity of Data-in-Flight (DiF) that was remotely estimated by said DiF measuring unit.

9. The system of claim 1, wherein the Cellular Congestion Management Unit comprises:

(a) a Buffer Delay (BD) measuring unit, to remotely estimate a current BD value which corresponds to a time-duration value of a time-delay in transport of packets that are temporarily buffered at a Cellular Base Station buffer of a Cellular Base Station that of said cellular network;
wherein the BD measuring unit further performs a checking whether a current BD value is greater than a previously-measured BD value,
(b) a Data-in-Flight (DiF) measuring unit, to remotely estimate a current DiF quantity, in packets or in bits, of cellular data that is pending for transport at said Cellular Base Station buffer of said Cellular Base Station of said cellular network;
wherein the Cellular Congestion Management Unit is to remotely estimate that said first UE is no longer experiencing a previously-detected cellular traffic congestion,
based on an analysis that takes into account at least: (i) the current Buffer Delay (BD) value that was remotely estimated by the BD measuring unit, and (ii) a trend-of-change in BD value that indicates that the BD value has recently decreased, and (iii) the current quantity of Data-in-Flight (DiF) that was remotely estimated by said DiF measuring unit.

10. The system of claim 1,
wherein the Cellular Congestion Management Unit comprises:
(a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;
wherein the BD measuring unit further performs a checking whether a current BD value is greater than a previously-measured BD value,
(b) a Data-in-Flight (DiF) measuring unit, to remotely estimate a current DiF quantity, in packets or in bits, of cellular data that is pending for transport at said Cellular Base Station buffer of said Cellular Base Station of said cellular network;
wherein the Cellular Congestion Management Unit is to remotely estimate that said first UE is currently experiencing cellular traffic congestion based on an analysis that takes into account at least:
(i) a determination that the current Buffer Delay (BD) value that was remotely estimated by the BD measuring unit is greater than T milliseconds, wherein T is a pre-defined threshold value; and
(ii) a determination that a trend-of-change in BD value that indicates that the most-recently-measured BD value is greater than the BD value that was measured immediately before it, and
(iii) a determination that the current quantity of Data-in-Flight (DiF) that was remotely estimated by said DiF measuring unit is at least P packets, wherein P is a pre-defined threshold value.

11. The system of claim 1, wherein the Cellular Congestion Management Unit comprises:
(a) a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;
wherein the BD measuring unit further performs a checking whether a current BD value is greater than a previously-measured BD value,
(b) a Data-in-Flight (DiF) measuring unit, to remotely estimate a current DiF quantity, in packets or in bits, of cellular data that is pending for transport at said Cellular Base Station buffer of said Cellular Base Station of said cellular network;
wherein the Cellular Congestion Management Unit is to remotely estimate that said first UE is no longer experiencing a previously-detected cellular traffic congestion,
based on an analysis that takes into account at least:
(i) a determination that the current Buffer Delay (BD) value that was remotely estimated by the BD measuring unit is smaller than T milliseconds, wherein T is a pre-defined threshold value; and
(ii) a determination that a trend-of-change in BD value that indicates that the most-recently-measured BD value is smaller than the BD value that was measured immediately before it.

12. The system of claim 1, further comprising:
an Application Classification Unit, to remotely perform a classification of a communication flow of said particular UE, as either an Important Application or a Non-Important Application;
a Traffic Shaping Unit, to remotely deploy traffic shaping only towards all traffic of all Non-Important Applications of said particular UE and not towards any traffic of any Important Applications of said particular UE.

13. The system of claim 12,
wherein the Application Classification Unit performs said classification by utilizing said Deep Packet Inspection (DPI) engine that analyzes traffic and classifies traffic into Important Applications or Non-Important Applications by using at least one of: (i) a pre-defined lookup table, (ii) pre-defined application classification rules.

14. The system of claim 13,
wherein the Traffic Shaping Unit is to remotely deploy said traffic shaping only towards (i) all the Non-Important Applications of said first UE and also towards (ii) all the Non-Important Applications of said first UE.

15. The system of claim 13,
wherein the Traffic Shaping Unit is to remotely deploy said traffic shaping only towards (i) all the Non-Important Applications of said first UE and also towards (ii) all the Non-Important Applications of said first UE;
wherein selective and application-based deployment of said traffic shaping towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE and mitigate cellular traffic congestion of Important Applications of said first UE.

16. The system of claim 13,
wherein the Traffic Shaping Unit is to remotely deploy a Bitrate Limiting process only towards (i) all the Non-Important Applications of said first UE and also towards (ii) all the Non-Important Applications of said first UE;
wherein selective and application-based deployment of said Bitrate Limiting process only towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE, and mitigate cellular traffic congestion of Important Applications of said first UE.

17. The system of claim 13,
wherein a Bitrate Limiting process is selectively applied on a per-application basis only towards (i) all the Non-Important Applications of said first UE and also towards (ii) all the Non-Important Applications of said first UE;
wherein said Bitrate Limiting process is a Bitrate Limiting process that constrains a transmission bitrate, that is allocated to a particular Non-Important Application, to one or more discrete and specific constrained-bitrate values that are pre-defined for a particular Non-Important Application,
and does not utilize an arbitrary target bitrate as a bitrate constraint for the transmission bitrate that is allocated to said particular Non-Important Application.

18. The system of claim 1,
wherein the Cellular Congestion Management Unit comprises:
a Buffer Delay (BD) measuring unit, to remotely estimate a current BD value which corresponds to a time-duration value of a time-delay in transport of packets that are temporarily buffered at a Cellular Base Station buffer of a Cellular Base Station of said cellular network;
wherein the Cellular Congestion Management Unit is to remotely estimate that said first UE is currently experiencing cellular traffic congestion based on an analysis that takes into account at least: a comparison between (i) the current BD value that was remotely estimated by the BD measuring unit, and (ii) a baseline BD value that was previously determined for said cellular network operating in a non-congested state;
wherein the system further comprises:
a Traffic Shaping Unit is to remotely and selectively deploy an application-aware Bitrate Limiting process only towards (i) all the Non-Important Applications of said first UE and also towards (ii) all the Non-Important Applications of said first UE;
wherein deployment of said application-aware Bitrate Limiting process only towards (i) all the Non-Important Applications of said first UE and also towards (ii) all the Non-Important Applications of said first UE, causes a free-up of bandwidth and of Physical Resource Blocks (PRBs) that were consumed by said Non-Important Applications, wherein at least some of freed-up bandwidth and at least some of freed-up PRBs are automatically consumed by Important Applications of said first UE, and mitigate cellular traffic congestion of Important Applications of said first UE;
wherein a Bitrate Limiting constraint, that is enforced by said Bitrate Limiting process, is determined by utilizing an inverse relation to a size of the current Buffer Delay (BD) value that was remotely estimated by the BD measuring unit; wherein a greater value of current Buffer Delay (BD) value triggers utilization of a lower value of the Bitrate Limiting constraint; wherein a smaller value of current Buffer Delay (BD) value triggers utilization of a greater value of the Bitrate Limiting constraint.

19. A method comprising:
mitigating cellular traffic congestion, that one or more User Equipment (UE) devices experience in a cellular communication network;
wherein the cellular communication network comprises at least a first UE and a second UE;
wherein said mitigating comprises:
(a) defining that a first application is considered an Important Application,
and defining that a second application is considered a Non-Important Application;
(b) measuring and monitoring one or more parameters related to traffic transmitted by or sent to the first UE, and remotely generating an estimate that the first UE is currently experiencing cellular traffic congestion;
wherein said estimate that the first UE is currently experiencing cellular traffic congestion, is generated remotely from the first UE and remotely from the second UE, and without knowledge of which particular cellular network cell is currently being utilized by the first UE or by the second UE;
(c) at a Deep Packet Inspection (DPI) Engine, performing DPI analysis of cellular data packets that are transmitted by and sent to the first UE;
and determining, based on DPI analysis, that the first UE is currently utilizing a first communication flow that is associated with an Important Application;
and further determining, based on DPI analysis, that the first UE is currently utilizing a second communication flow that is associated with a Non-Important Application;
(d) at a Bitrate Limiting Unit, remotely and selectively enforcing filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE;
wherein remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE;
wherein the remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

20. A non-transitory storage medium having stored thereon instruction that, when executed by a processor, cause the processor to perform a method comprising:
mitigating cellular traffic congestion, that one or more User Equipment (UE) devices experience in a cellular communication network;

wherein the cellular communication network comprises at least a first UE and a second UE;

wherein said mitigating comprises:

(a) defining that a first application is considered an Important Application, and defining that a second application is considered a Non-Important Application;

(b) measuring and monitoring one or more parameters related to traffic transmitted by or sent to the first UE, and remotely generating an estimate that the first UE is currently experiencing cellular traffic congestion;

wherein said estimate that the first UE is currently experiencing cellular traffic congestion, is generated remotely from said first UE and remotely from the second UE, and without knowledge of which particular cellular network cell is currently being utilized by the first UE or by the second UE;

(c) at a Deep Packet Inspection (DPI) Engine, performing DPI analysis of cellular data packets that are transmitted by and sent to the first UE;

and determining, based on DPI analysis, that the first UE is currently utilizing a first communication flow that is associated with an Important Application;

and further determining, based on DPI analysis, that the first UE is currently utilizing a second communication flow that is associated with a Non-Important Application;

(d) at a Bitrate Limiting Unit, remotely and selectively enforcing filtering pass-through bitrate limits on communication flows of the first UE, by enforcing a reduced bitrate limit on the second communication flow that is associated with a Non-Important Application of the first UE, and by not enforcing a reduced bitrate limit on the first communication flow that is associated with an Important Application of the first UE;

wherein remote and selective enforcement of the reduced bitrate limit, on the second communication flow that is associated with a Non-Important Application of the first UE, causes a free-up of Physical Resource Blocks (PRBs) at a Cellular Base Station that currently services the first UE, and causes an increase in bandwidth and a reduction in cellular traffic congestion that is experienced by Important Applications of said first UE if one or more Important Applications are running on the first UE, and further causes an increase in bandwidth and a reduction in cellular traffic congestion that is experienced by Important Applications of said second UE if one or more Important Applications are running on the second UE and if the second UE is currently serviced by the same said Cellular Base Station that currently services the first UE;

wherein the remote and selective enforcement of the reduced bitrate limit, (I) is performed without determining, or relying upon, a total cellular traffic bandwidth that is available for the first and second UEs; and (II) is performed without re-allocating a total cellular traffic bandwidth among applications based on their bandwidth needs; and (III) is performed without determining which particular other UEs are expected to benefit from said remote and selective enforcement of the reduced bitrate limit.

* * * * *